(12) United States Patent
Agiwal et al.

(10) Patent No.: US 11,057,903 B2
(45) Date of Patent: Jul. 6, 2021

(54) METHOD AND APPARATUS FOR PROCESSING PRIORITY IN D2D COMMUNICATION SYSTEM

(71) Applicant: Samsung Electronics Co., Ltd., Suwon-si (KR)

(72) Inventors: Anil Agiwal, Suwon-si (KR); Manali Sharma, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/328,351

(22) PCT Filed: Apr. 1, 2016

(86) PCT No.: PCT/KR2016/003434
§ 371 (c)(1),
(2) Date: May 1, 2017

(87) PCT Pub. No.: WO2016/159728
PCT Pub. Date: Oct. 6, 2016

(65) Prior Publication Data
US 2017/0245292 A1    Aug. 24, 2017

(30) Foreign Application Priority Data

Apr. 1, 2015   (IN) .......................... 1757/CHE/2015
Jul. 14, 2015  (IN) .......................... 3590/CHE/2015
(Continued)

(51) Int. Cl.
*H04W 72/10*    (2009.01)
*H04W 28/02*    (2009.01)
(Continued)

(52) U.S. Cl.
CPC .......... *H04W 72/10* (2013.01); *H04W 28/02* (2013.01); *H04W 72/1242* (2013.01); *H04W 72/14* (2013.01)

(58) Field of Classification Search
None
See application file for complete search history.

(56) References Cited

U.S. PATENT DOCUMENTS 7,051,135 B2    5/2006  Zhu
2010/0135241 A1  6/2010  Wang
(Continued)

FOREIGN PATENT DOCUMENTS

CN    101060474 A    10/2007
CN    101459597 A    6/2009
(Continued)

OTHER PUBLICATIONS

Ericsson, Prioritization Rules Between Resource Pools, 3GPP TSG-RAN WG1 Meeting #79, Nov. 17-21, 2014, R1-145154, San Francisco, USA.
(Continued)

*Primary Examiner* — Khaled M Kassim
(74) *Attorney, Agent, or Firm* — Jefferson IP Law, LLP

(57) ABSTRACT

A method for processing a priority for transmission by a user equipment (UE) in a device-to-device (D2D) communication system are provided. The method includes receiving a priority for a packet to be transmitted from a higher layer, mapping the packet to a logical channel based on the priority and a destination to which the packet is to be transmitted, receiving a grant for the transmission of the packet from a base station, and transmitting the packet.

12 Claims, 16 Drawing Sheets

(30) Foreign Application Priority Data

| Aug. 11, 2015 | (IN) | ............................ 4170/CHE/2015 |
| Sep. 18, 2015 | (IN) | ............................ 5011/CHE/2015 |
| Oct. 29, 2015 | (IN) | ............................ 5834/CHE/2015 |

(51) Int. Cl.
*H04W 72/12* (2009.01)
*H04W 72/14* (2009.01)

(56) References Cited

U.S. PATENT DOCUMENTS

| 2011/0038264 | A1 | 2/2011 | Ishii |
| 2014/0094183 | A1 | 4/2014 | Gao et al. |
| 2015/0117332 | A1* | 4/2015 | Li .......................... H04W 76/18 370/329 |
| 2015/0173048 | A1* | 6/2015 | Seo ................... H04W 72/1247 370/329 |
| 2017/0006628 | A1* | 1/2017 | Takahashi ............. H04W 76/14 |
| 2017/0041882 | A1* | 2/2017 | Chae ..................... H04W 52/18 |
| 2017/0126306 | A1* | 5/2017 | Kim ...................... H04W 76/14 |
| 2017/0171837 | A1 | 6/2017 | Chen et al. |
| 2017/0230939 | A1* | 8/2017 | Rudolf .................. H04W 88/02 |
| 2017/0245245 | A1* | 8/2017 | Kim .................. H04W 72/1284 |
| 2017/0257876 | A1* | 9/2017 | Loehr .................... H04L 5/0044 |
| 2017/0303291 | A1* | 10/2017 | Chae ..................... H04W 72/12 |
| 2018/0234995 | A1* | 8/2018 | Jung ................. H04W 72/1278 |
| 2018/0255499 | A1* | 9/2018 | Loehr .................. H04B 7/2606 |
| 2018/0255559 | A1* | 9/2018 | Lee ........................ H04W 72/10 |
| 2018/0279162 | A1* | 9/2018 | Yi .......................... H04W 76/14 |

FOREIGN PATENT DOCUMENTS

| CN | 102088736 A | 6/2011 |
| CN | 102547871 A | 7/2012 |
| CN | 103354641 A | 10/2013 |
| CN | 103843444 | 6/2014 |
| CN | 104185281 A | 12/2014 |
| CN | 104284436 A | 1/2015 |
| CN | 104811892 A | 7/2015 |
| KR | 10-2014-0121050 A | 10/2014 |
| WO | 2013/191360 A1 | 12/2013 |
| WO | 2015/021185 A1 | 2/2015 |

OTHER PUBLICATIONS

Chinese Office Action dated Mar. 16, 2020, issued in a counterpart Chinese Application No. 201680020264.0.

* cited by examiner

Proposed BSR Structure 1

| DESTINATION INDEX 1 | Num LCGs |
|---|---|
| LCG ID $_1$ | BS |

| LCG ID $_p$ | BS |
|---|---|
| DESTINATION INDEX 2 | Num LCGs |
| LCG ID $_1$ | BS |

| LCG ID $_q$ | BS |
|---|---|
| DESTINATION INDEX N | Num LCGs |
| LCG ID $_1$ | BS |

| LCG ID $_r$ | BS |
|---|---|

FIG.17

METHOD AND APPARATUS FOR PROCESSING PRIORITY IN D2D COMMUNICATION SYSTEM

CROSS-REFERENCE TO RELATED APPLICATION(S)

This application is a U.S. National Stage application under 35 U.S.C. § 371 of an International application filed on Apr. 1, 2016 and assigned application number PCT/KR2016/003434, which claimed the benefit of an Indian patent application filed on Apr. 1, 2015 in the Indian Patent Office and assigned Serial number 1757/CHE/2015, and of an Indian patent application filed on Jul. 14, 2015 in the Indian Patent Office and assigned Serial number 3590/CHE/2015, and of an Indian patent application filed on Aug. 11, 2015 in the Indian Patent Office and assigned Serial number 4170/CHE/2015, and of an Indian patent application filed on Sep. 18, 2015 in the Indian Patent Office and assigned Serial number 5011/CHE/2015, and of an Indian patent application filed on Oct. 29, 2015 in the Indian Patent Office and assigned Serial number 5834/04E/2015, the entire disclosure of each of which is hereby incorporated by reference.

TECHNICAL FIELD

The present disclosure relates to communication methods and apparatuses in device-to-device (D2D) communication systems. More particularly, the present disclosure relates to methods and apparatuses for efficiently transmitting and receiving packets in D2D communication systems.

BACKGROUND

In order to meet the demand for wireless data traffic soaring since the 4$^{th}$ generation (4G) communication system came to the market, there are ongoing efforts to develop enhanced 5th generation (5G) communication systems or pre-5G communication systems. For this reason, the 5G communication system or pre-5G communication system has been called the beyond 4G network communication system or post long term evolution (LTE) system.

For higher data transmit rates, 5G communication systems are considered to be implemented on ultra-high frequency bands (mm Wave), such as, for example, 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, for example, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

To enable data communication services between user equipments (UEs), communication standardization groups are researching D2D communication. Hereinafter, in this disclosure, a UE performing D2D communication is simply referred to as a UE or D2D UE. During D2D communication, a transmitting D2D UE may transmit data packets to a group of D2D UEs, broadcast data packets to all of the D2D UEs, or transmit unicast data packets to a particular D2D UE. D2D communication between a transmitter and a receiver(s), by its nature, is a non-connection. The transmitter may be appreciated as a transmitting D2D UE, and the receiver may be appreciated as a receiving D2D UE. In other words, D2D communication lacks a connection establishment (or exchange of control messages) between the transmitter and the receiver before the transmitter starts to transmit data packets. During transmission, the transmitter includes a source identifier and destination identifier in the data packets and transmits them. The source identifier is set as the UE identification (ID) of the transmitter. The destination identifier is an identifier for a recipient intended for a packet transmitted. The destination identifier may indicate whether the packet is a broadcast packet or unicast packet or which group (e.g., a D2D UE group) the packet has been scheduled for. The destination identifier may be set as a broadcast group identifier in the broadcast packet. Further, the destination identifier may be identified as a group identifier of an intended group in a groupcast packet. Also, the destination identifier may be set as a UE ID in a unicast packet.

The above information is presented as background information only to assist with an understanding of the present disclosure. No determination has been made, and no assertion is made, as to whether any of the above might be applicable as prior art with regard to the present disclosure.

SUMMARY

Legacy device-to-device (D2D) communication systems have a method for transmitting and receiving, by a user equipment (UE), packets but lacks a method for processing, if any, priority in transmission among packets.

Aspects of the present disclosure are to address at least the above-mentioned problems and/or disadvantages and to provide at least the advantages described below. Accordingly, an aspect of the present disclosure is to provide a method and apparatus for efficiently processing priority for transmission in a D2D communication system.

Another aspect of the present disclosure is to provide a method and apparatus for allocating resources considering priority for transmission in a D2D communication system.

Another aspect of the present disclosure is to provide a sidelink (SL) buffer status report (BSR) method and apparatus for unicast in a D2D communication system.

In accordance with an aspect of the present disclosure, a method for processing a priority for transmission by a user equipment (UE) in a device-to-device (D2D) communication system is provided. The method includes receiving a priority for a packet to be transmitted from a higher layer, mapping the packet to a logical channel based on the priority and a destination to which the packet is to be transmitted, receiving, from a base station, a grant for the transmission of the packet, and transmitting the packet.

In accordance with another aspect of the present disclosure, a user equipment (UE) in a device-to-device (D2D) communication system is provided. The UE includes a transceiver configured to transmit and receive data, and at least one processor configured to: receive a priority for a packet to be transmitted from a higher layer, map the packet to a logical channel based on the priority and a destination to which the packet is to be transmitted, receive, from a base station, a grant for the transmission of the packet, and transmit the packet.

In accordance with another aspect of the present disclosure, a method for processing a priority for transmission by a base station in a device-to-device (D2D) communication system is provided. The method includes configuring a plurality of resource pools for the D2D communication, each of the resource pools having at least one priority, and signaling priority information on the plurality of resource pools.

In accordance with another aspect of the present disclosure, a base station in a device-to-device (D2D) communication system is provided. The base station includes a transceiver configured to transmit and receive data, and at least one processor configured to: configure a plurality of resource pools for the D2D communication, each of the resource pools having at least one priority, and signal priority information on the plurality of resource pools.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 17 and 18 are views illustrating a BSR structure for reducing overhead according to an embodiment of the present disclosure.

Throughout the drawings, like reference numerals will be understood to refer to like parts, components, and structures.

DETAILED DESCRIPTION

Figure 1:
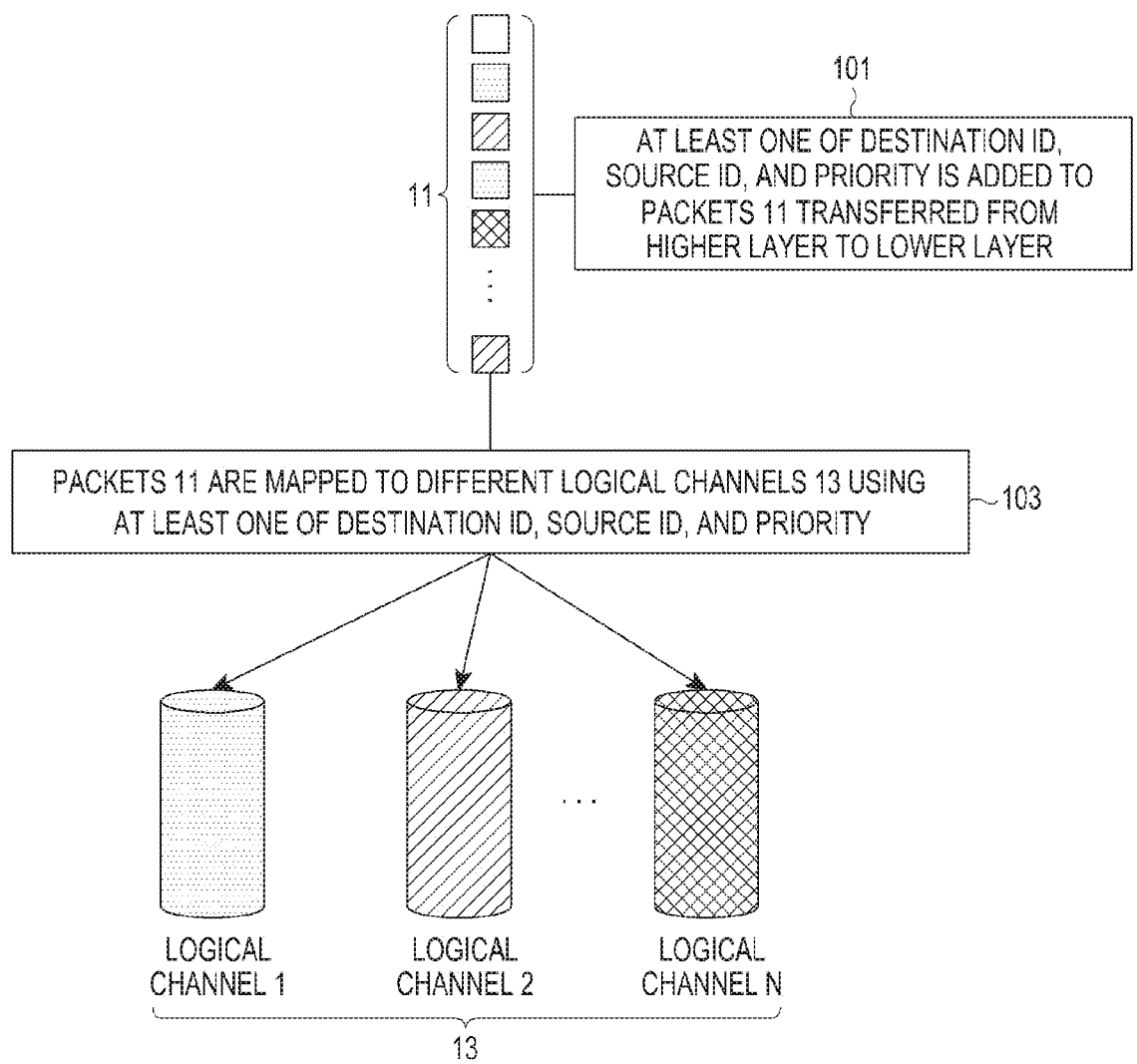
FIG. 1 is a view illustrating an example of mapping logical channels to packets in a device-to-device (D2D) communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When determined to make the subject matter of embodiments of the present disclosure unclear, the details of the known functions or configurations may be skipped.

Although the following embodiments of the present disclosure are described assuming device-to-device (D2D) communication offered in long term evolution (LTE) systems for convenience, it should be noted that methods as proposed according to embodiments of the present disclosure may also apply to other communication systems providing D2D communication in the same or similar manner.

First, a resource allocation method in D2D communication is described for a better understanding of the present disclosure. For packet transmission in D2D communication, a transmitter requires resources (e.g., time and frequency resources). Examples of methods for obtaining resources for packet transmission include a dedicated-resource allocation method and a contention-based resource allocation method, are described below.

The dedicated resource allocation method is described, as follows. A user equipment (UE) (e.g., a device, terminal, or mobile station) interested in D2D direct communication transmission transmits sidelink (SL) UE information (SidelinkUEInformation) containing a destination information list (destinationInfoList) (i.e., a list of proximity service (ProSe) layer-2 group identification (ID(s)) among active groups) to a base station (or evolved nodeB (eNB)). The SL may be appreciated in the same meaning as the D2D link (or direct link) of D2D communication. The eNB allocates a D2D-radio network temporary identifier (RNTI), which is a UE identifier, and resource pool to transmit the SL control information. Then, the UE transmits, to the eNB, a D2D buffer status report (BSR) requesting a dedicated resource for control and data transmission. The D2D BSR may include a logical channel group (LCG) ID, a buffer status, and a group index of the destination group. As an example, the LCG ID in the D2D BSR may be set as a fixed value. The group index of the destination group is an order of D2D layer-2 group IDs in the destination information list (destinationInfoList). The eNB allocates dedicated resources and transmits information about the dedicated resources through a physical downlink control channel masked with the D2D-RNTI. Dedicated-resource allocation methods of the related art lack priority processing in the eNB or UE.

The contention-based resource allocation method is described, as follows. In the contention-based resource allocation method, up to four transmit (TX) resource pools may be set for D2D communication transmission. However, the UE may randomly select one of the TX resource pools for transmission or always select the first resource pool for D2D transmission. Proposed in some methods is allocating a different TX resource pool to each group. However, this may require a significant number of resource pools.

According to an embodiment of the present disclosure, each group for D2D communication may be related to the priority. In such case, some priority levels are supported. On emergency, the group priority may be changed into the highest level. The following problems may ensue upon supporting the priority processing for D2D communication:

a) How the priority is indicated to the eNB? It should be noted that the D2D BSR has no priority field.

b) How dynamic priority is to be treated? It should be noted that the priority varies during emergency.

c) How the priority information is to be utilized in the contention-based resource allocation method?

d) In the dedicated-resource allocation method, the eNB may use priority information about the priority of transmission over users (UEs) or groups. This is unavailable for the contention-based resource allocation method.

Now described are methods proposed according to embodiments of the present disclosure to process the priority in D2D communication.

A priority is allocated to each packet. The priority may be allocated to the ProSe protocol layer, non-access stratum (NAS) layer, or application layer. The priority may be indicated using scalar values (e.g., 1, 2, and 3). In UEs consisting of a higher layer and lower layer, the lower layer (e.g., a packet data convergence protocol (PDCP) layer, radio link control (RLC) layer, or medium access control (MAC) layer) in a transmitting UE receives the priority from the higher layer (e.g., a ProSe protocol layer, NAS layer, or application layer) to transmit a packet. The priority of the packet may be the priority of the group or user (UE) that the packet targets. The priority of the packet may be the priority of the user (UE) transmitting the packet. In contrast, the priority of the packet may be the priority of the type (e.g., emergency or normal) of a call that the user (UE) dispatches along with the destination. The priority may be determined considering the priority for both the group and type of the call. The priority may be determined considering the priority of user (UE), type of call, and priority of group.

As an example, the packet to be transmitted is related to the priority in addition to the destination ID.

Where the UE has multiple source IDs, a source ID may be allocated to the packet. A destination ID, source ID, and priority are received from the higher layer. Packets of different priorities are mapped to different logical channels. Packets of different destination IDs are also mapped to different logical channels. Packets of different source IDs are also mapped to different logical channels. An example of mapping to a logical channel is shown in FIG. 1.

FIG. 1 is a view illustrating an example of mapping logical channels to packets in a D2D communication system according to an embodiment of the present disclosure.

Referring to FIG. 1, packets 11 transferred from the higher layer to the lower layer are added (tagged) with at least one of the destination ID, source ID, and priority at operation 101, and the packets 11 are mapped to different logical channels 13 using at least one of the destination ID, source ID, and priority at operation 103.

If the UE has one source ID, the source ID might not be used to map the packets to the logical channels. There is no fixed mapping between a logical channel and priority, and the priority of a logical channel is the priority of the packets mapped to the logical channel. According to an embodiment of the present disclosure, in order to transmit a packet, the UE sends a request for resources to the eNB by sending a D2D BSR containing a logical channel group (LCG) ID. The LCG ID field in the BSR is set as follows: An LCG is defined per destination, and for one destination, each logical channel is mapped (allocated) to one of the LCGs according to the priority of the logical channel. The LCG is identified by an LCG ID. The UE determines the LCG ID corresponding to the priority of the logical channel.

As an example, the LCG ID may be determined using pre-defined mapping between the priority and the LCG ID. An example of such a mapping table is shown below in Table 1. Four priority levels mapped to distinct LCG IDs are exemplified.

TABLE 1

| LCG ID | Priority |
|--------|----------|
| 0 | Emergency |
| 1 | High |
| 2 | Medium |
| 3 | Low |

As an example, each LCG ID may be mapped to multiple priority levels. For example, where there are eight priority levels, each LCG ID may be mapped to two priority levels.

LCG ID 0: Priority level 0 (highest), priority level 1
LCG ID 1: Priority level 2, priority level 3
LCG ID 2: Priority level 4, priority level 5
LCG ID 3: Priority level 6, priority level 7 (lowest)

As another example, the mapping table between priorities and LCG IDs may be subject to broadcast signaling (e.g., system information block (SIB)) by the network (or the eNB) or may be signaled to the UE through dedicated signaling (e.g., a radio resource control (RRC) connection reconfiguration message responsive to a D2D UE information message containing a destination ID list). Each LCG ID may be mapped to multiple priority levels. The UE may send a list of destination IDs through the D2D UE information message. As an example, the UE may also transmit, to the eNB, the priorities of the logical channels and/or logical channel identifier (LCID) for each destination in the D2D UE information message. The eNB signals what logical channel (or LCID) is mapped to what LCG (or LCG ID). In contrast, the eNB may signal the mapping between the LCG ID and the priority. Then, the UE maps the logical channels having the same priority to a corresponding LCG ID (i.e., an LCG ID related to the priority).

When the BSR is transmitted, the buffer size of an LCG ID related to a higher priority is first included in the SL BSR, and the buffer status of the LCG IDs related to a lower priority are then included therein.

The UE transmits a D2D BSR containing the determined LCG ID to the eNB. Upon receiving the BSR, the eNB determines the priority corresponding to the LCG ID received through the BSR. The eNB may verify whether it is permitted for the UE to transmit in the determined priority. The verification may selectively be performed. Such verification is carried out using the priority information (priority of UE, group priority, or highest priority per packet) received in the UE's context received from the mobile management entity (MME), which is a network entity managing the mobility of the UE. As an example, where the determined priority is lower or equal to the highest priority indicated in the UE's context, the UE is permitted to transmit in the determined priority. As another example, where the determined priority is equal to the highest priority indicated in the UE's context, the UE is permitted to transmit in the determined priority. Then, the eNB prioritizes the transmission according to the determined priority and allocates a grant to the UE. Then, the UE sends packets using the allocated grant (resource).

As an example, the eNB may retain a separate resource pool per priority level and assign resources from the resource pool corresponding to the determined priority.

As another example, there may be only one resource pool, and the eNB allocates grants (resources) in descending order of priority.

As another example, the priority indicated by the LCG ID is the priority of the destination ID (e.g., group ID). The eNB may retain a separate resource pool per priority level and assign resources from the resource pool corresponding to the determined priority. If multiple requests from several UEs are for the same priority level, the priority of UE is used to prioritize the requests.

As another example, where multiple requests from multiple UEs are for the same priority level, the multiple requests may be prioritized based on the destination ID. For example, unicast is prioritized over groupcast.

Figure 2:
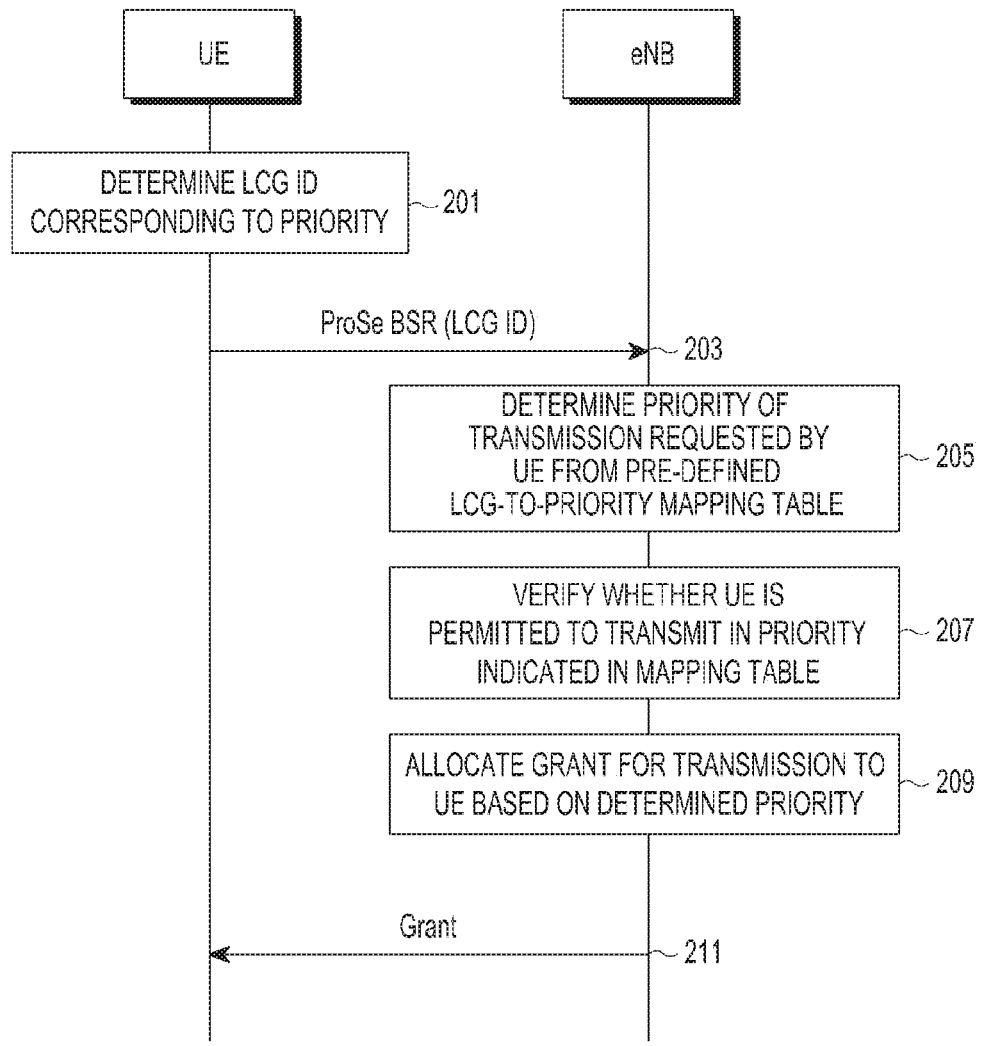
FIGS. 2, 3A, and 3B are views illustrating methods for processing a priority of transmission in a D2D communication system according to an embodiment of the present disclosure.
Figure 3A:
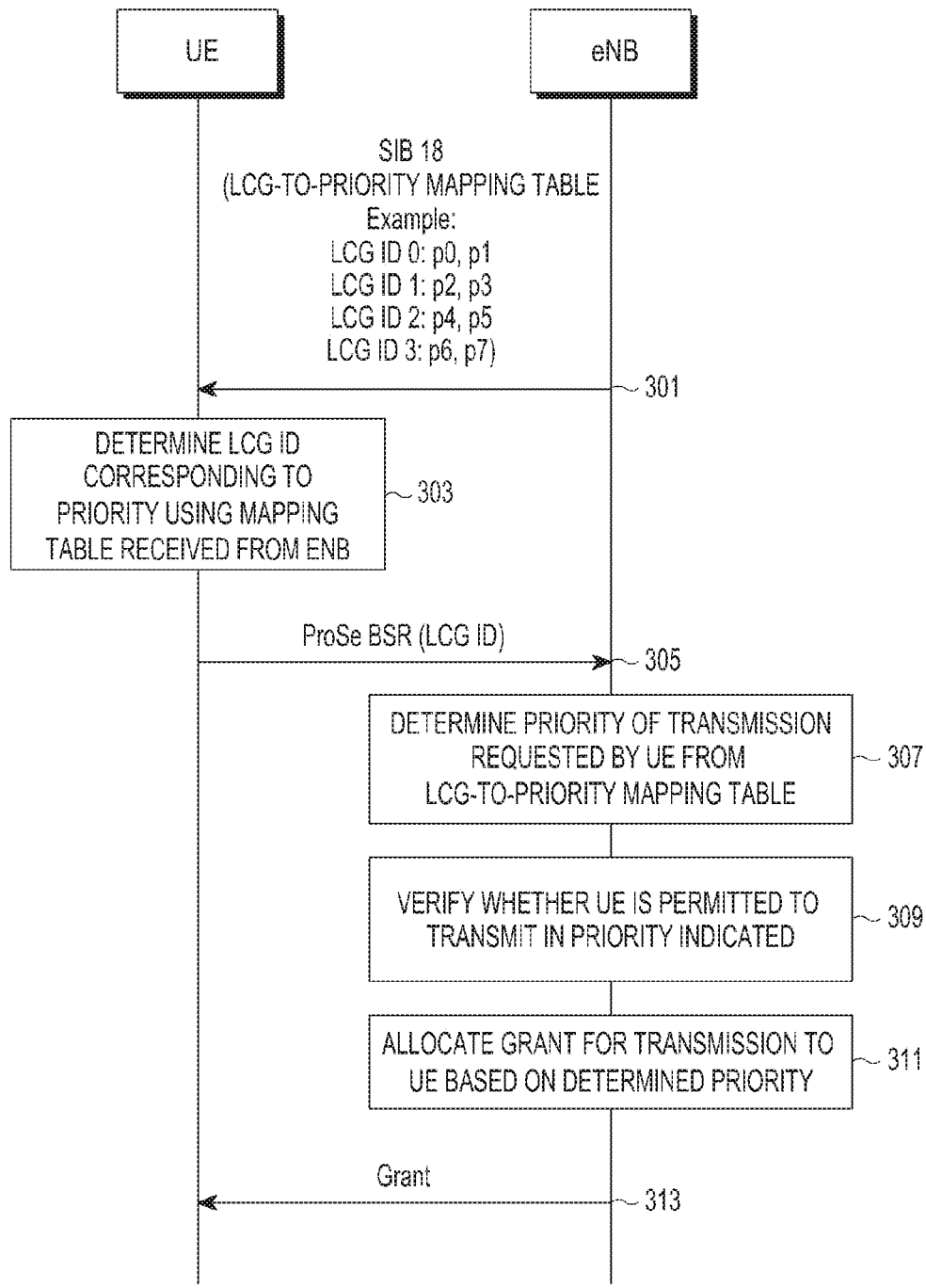
Figure 3B:
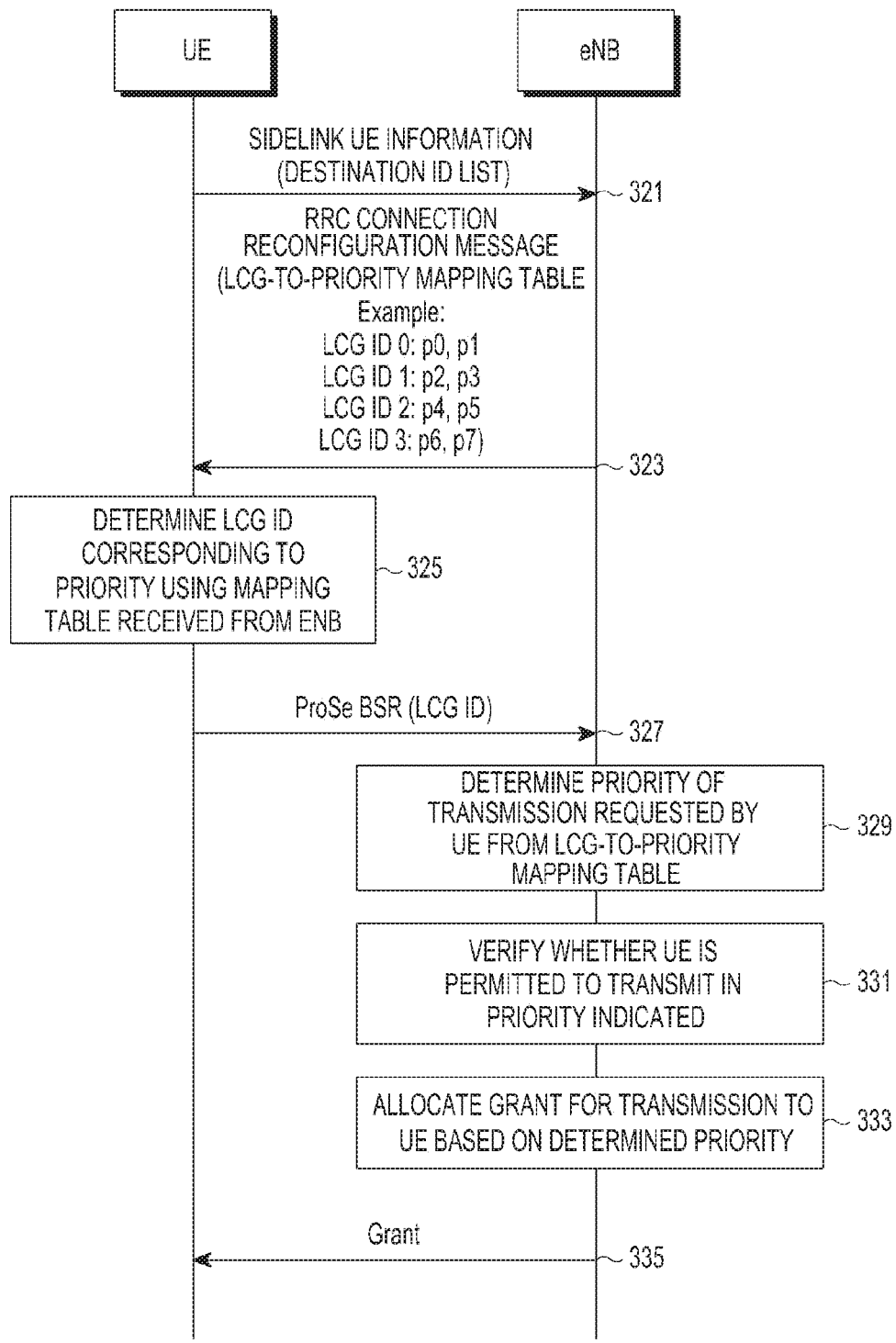

Now described are example methods shown in FIGS. 2, 3A, and 3B according to an embodiment of the present disclosure.

FIG. 2 is a view illustrating a method for handling priority of a transmission in a D2D communication system according to an embodiment of the present disclosure.

Referring to FIG. 2, in operation 201, the UE determines an LCG ID corresponding to a priority. In operation 203, the UE transmits a D2D BSR containing the determined LCG ID to the eNB. In FIG. 2, the ProSe BSR means the BSR of D2D communication (i.e., D2D BSR). The ProSe BSR and D2D BSR may simply be referred to as BSR. In operation 205, the eNB receiving the BSR determines the priority of the transmission requested by the UE from a pre-defined LCG-to-priority mapping table. An example of the mapping table is shown in Table 1 above. In operation 207, the eNB verifies whether the transmission by the UE in the priority indicated in the mapping table (to correspond to the LCG received in operation 203) is permitted. Thereafter, in operation 209 (where the UE's transmission in the indicated priority is verified), the eNB allocates a grant (resource) for transmission to the UE based on the indicated (determined) priority. In operation 211, the eNB transmits the grant (resource) to the UE.

FIG. 3A illustrates a method for handling the priority of transmission in a D2D communication system according to an embodiment of the present disclosure. FIG. 3A illustrates a priority processing method in which the UE receives an LCG-to-priority mapping table through broadcast signaling (e.g., SIB) from the eNB to determine an LCG ID corresponding to the priority.

Referring to FIG. 3A, in operation 301, the UE receives the mapping table through the SIB from the eNB. As the mapping table, the mapping table as shown above in Table 1 or a mapping table in which each LCG ID is mapped to multiple priority levels as in the example of FIG. 3A may come into use. In operation 303, the UE determines an LCG ID corresponding to the priority using the mapping table received from the eNB. Thereafter, the operations of 305, 307, 309, 311, and 313, in which the UE sends a BSR containing the LCG ID to the eNB and receives a grant from the eNB, are the same as the operations of 203, 205, 207, 209, and 211 of FIG. 2 except for using the mapping table provided to the UE through the SIB.

FIG. 3B illustrates a method for handling the priority of a transmission in a D2D communication system according to an embodiment of the present disclosure. FIG. 3B illustrates a priority processing method in which the UE receives an LCG-to-priority mapping table through dedicated signaling (e.g., an RRC connection reconfiguration message responsive to the D2D UE information message containing a destination ID list) from the eNB to determine an LCG ID corresponding to the priority.

Referring to FIG. 3B, in operation 321, the UE transmits, to the eNB, the D2D UE information message (e.g., an SL UE information message) containing a destination information list (e.g., a destination ID list). Then, in operation 323, the UE receives an RRC connection reconfiguration message containing the mapping table from the eNB in response to the D2D UE information message. As the mapping table, the mapping table as shown above in Table 1 or a mapping table in which each LCG ID is mapped to multiple priority levels as in the example of FIG. 3B may come into use. In operation 325, the UE determines an LCG ID corresponding to the priority using the mapping table received from the eNB. Thereafter, the operations of 327, 329, 331, 333, and 335, in which the UE sends a BSR containing the LCG ID to the eNB and receives a grant from the eNB, are the same as the operations of 203, 205, 207, 209, and 211 of FIG. 2 except for using the mapping table provided to the UE through the RRC connection reconfiguration message.

Meanwhile, as indicated above, when the UE receives the allocated grant from the eNB, the UE transmits packets using grants assigned in descending order of priority. As an example, where the priority is the priority of a destination group, the UE performs transmission to destination group(s) using the grants allocated in descending order of priority of destination group(s). During a scheduling control period, the UE may establish one or more medium access control protocol data units (MAC PDUs) for a particular destination in the grant received from the eNB. MAC service data units (MAC SDUs) from only one destination may be included in the MAC PDU.

If a grant is received during the scheduling control period, the UE may perform scheduling as in option 1, 2, or 3 as follows:

a) Option 1: A MAC entity will perform the following logical channel prioritization procedure when a new transmission is performed. The MAC entity will allocate resources to logical channels as per operations 0, 1, and 2 below:

Operation 0: The UE selects the destination having the SL logical channel of the highest priority among SL logical channels available for transmission. Then, the UE supports all SL logical channels belonging to the selected destination (which may be a group or a UE) in descending order of priority. If multiple grants are received during the scheduling control period, the UE abstains from selecting the previously selected destination during the scheduling control period. That is, the UE performs operations 1 and 2 below.

Operation 1: The UE allocates resources to the SL logical channel of the highest priority among SL logical channels having the selected destination (i.e., belonging to the selected destination) and available data for transmission.

Operation 2: If some resources are left, SL logical channels belonging to the same ProSe destination as the SL logical channel in the previous operation are supported in descending order of priority until the SL grant or data for the SL logical channel(s) is/are exhausted, whichever is earlier. The SL logical channels set to have the same priority should be supported equally.

Examples of option 1 above are as follows. In embodiments of the present disclosure, a lower value of priority is assumed to have a higher priority. For example, priority 0 has a higher priority over priority 1. As another example, a higher value of priority may be assumed to have a higher priority.

Example 1: The UE is assumed to transmit to three destinations each having two logical channels.

Destination ID 1: Logical channel 1 (priority 0); logical channel 2 (priority 1)

Destination ID 2: Logical channel 1 (priority 2); logical channel 2 (priority 3)

Destination ID 3: Logical channel 1 (priority 4); logical channel 2 (priority 5)

In Example 1 above, since the logical channels of destination ID1 has the highest priority over other destinations, the logical channels of destination ID1 are supported in descending order of priority in the received grant.

Example 2: The UE is assumed to transmit to three destinations each having two logical channels.

Destination ID 1: Logical channel 1 (priority 0); logical channel 2 (priority 4)

Destination ID 2: Logical channel 1 (priority 2); logical channel 2 (priority 3)

Destination ID 3: Logical channel 1 (priority 5); logical channel 2 (priority 6)

In the case of Example 2 above, logical channel 1 of destination ID1 has the highest priority, and is thus supported first. In this case, if, after logical channel 1 is supported, resources are still available, what should the UE do? Since, in one grant, the UE should send MAC PDU(s) to the same destination, the UE cannot support logical channels for other destinations. The UE may support logical channel 2 of destination ID1. In this case, since lower-priority packets are sent before higher-priority packets are sent, this may lead to a violation of priority. Unless the UE supports logical channel 2 of destination ID1, the grant will be wasted. Accordingly, it is preferable to support logical channel 2 of destination ID1.

Where multiple grants are received, the UE performs operation 0 to operation 2 on each grant in Option 1 above.

b) Option 2: If multiple grants are received from the eNB during the scheduling control period, the UE configures one or more MAC PDUs for a particular destination in each grant.

UE supports the destinations in descending order of priority of the highest-priority logical channel of them. For example, it is assumed that three destinations having the following channels are present.

Destination ID 1: Logical channel 1 (priority 0); logical channel 2 (priority 1)

Destination ID 2: Logical channel 1 (priority 2); logical channel 2 (priority 3)

Destination ID 3: Logical channel 1 (priority 4); logical channel 2 (priority 5)

In the above example, logical channel 1 has the highest priority among logical channels in each of destination ID 1, ID 2, and ID 3. In the above example, since "priority of logical channel of highest priority in destination ID 1> priority of logical channel of highest priority in destination ID 2> priority of logical channel of highest priority in destination ID 3," if three grants are received within the scheduling control period, destination 1 is scheduled in grant 1, destination 2 is scheduled in grant 2, and destination 3 is scheduled in grant 3. As an example, destination 1 may be supported in the largest grant of grants 1, 2, and 3. Destination 2 may be supported in the larger of the remaining two grants. Destination 3 may be supported in the last grant. While some destination is supported, all logical channels for the destination are supported in strict descending order of priority until data or grant for the logical channel is exhausted, whichever is earlier. As an example, since the priority of logical channel 1 is higher than the priority of logical channel 2 while destination ID1 is supported (served), logical channel 1 is first supported, and logical channel 2 is then supported. The logical channels set to have the same priority should be supported equally.

One destination is supported in each grant. A destination associated with a grant may be indicated in the grant. In contrast, the UE may determine destination-to-grant mapping based on a size of the grant and data available to each destination (for all the logical channels).

c) Option 3: UE supports the destinations in descending order of priority of the highest-priority logical channel of them over scheduling control periods. For example, it is assumed that three destinations having the following channels are present.

Destination ID 1: Logical channel 1 (priority 0); logical channel 2 (priority 1)

Destination ID 2: Logical channel 1 (priority 2); logical channel 2 (priority 3)

Destination ID 3: Logical channel 1 (priority 4); logical channel 2 (priority 5)

In the above example, logical channel 1 has the highest priority among logical channels in each of destination ID 1, ID 2, and ID 3. In the above example, since "priority of logical channel of highest priority in destination ID 1> priority of logical channel of highest priority in destination ID 2> priority of logical channel of highest priority in destination ID 3," if one grant is received within each scheduling control period, destination 1 is scheduled in the first grant (e.g., scheduling period x), destination 2 is scheduled in the next grant (e.g., scheduling period y), and destination 3 is scheduled in the next grant (e.g., scheduling period z). While some destination is supported, all logical channels for the destination are supported in strict descending order of priority until data or grant for the logical channel is exhausted, whichever is earlier. As an example, since the priority of logical channel 1 is higher than the priority of logical channel 2 while destination ID1 is supported, logical channel 1 is first supported, and logical channel 2 is then supported. The logical channels set to have the same priority should be supported equally.

As another example, the packet to be transmitted is related to the priority in addition to the destination ID. Packets of different priorities are mapped to different logical channels. Packets of different destination IDs are also mapped to different logical channels. In the grant received from the eNB during the scheduling control period, the UE may establish one or more MAC PDUs, and at this time, the MAC PDU may include MAC SDUs from one or more destinations. When a grant is received during the scheduling control period, the UE performs scheduling, as follows: The UE supports logical channels capable of data transmission in descending order of priority related to each logical channel. In this case, the MAC header of a scheduling assignment (SA) and MAC PDU transmitted before the MAC PDU(s) is sent contains a broadcast ID. The respective destination IDs for the MAC SDUs are included in the MAC control element(s) (MAC CE). The MAC PDU format version number in the MAC header indicates whether the MAC PDU has MAC SDUs for several destinations. By contrast, the SA sent before the MAC PDU(s) are transmitted contains a broadcast ID or part of the broadcast ID. The respective destination IDs for the MAC SDUs are included in the MAC header. The MAC PDU format version number in the MAC header indicates whether the MAC PDU has MAC SDUs for several destinations. This oftentimes denotes that several destination IDs are present in the MAC header.

As another example, the logical channel ID (LCID), instead of the LCG ID for priority, may be mapped to the priority. Then, one or more LCIDs (logical channels) are mapped to the LCG ID (logical channel group). The mapping between LCID and priority may be unchanged. The mapping between LCID and LCG ID may be signaled or fastened through broadcast signaling (e.g., SIB) or dedicated signaling (e.g., RRC connection reconfiguration message) by the eNB or network.

As an example, the UE may transmit the LCID and/or relevant priority to the eNB through a D2D UE information message for each logical channel. The eNB signals what LCIDs are mapped to what LCG ID. The UE maps several packets of ProSe per-packet priority to different logical channels.

Lower (Backward) Compatibility Processing:
  Scenario 1: Release 12 Network to Release 13 UE
  1) The UE transmits a fixed value (e.g., 3) in LCG ID=D2D BSR, not LCG ID.
  Problem: The network grasps the D2D BSR and cannot discard the same.
  2) Solution
  The network indicates whether to support priority processing using the following.
    a) Signaling capability.
    b) Setting up higher layer.
    c) Reconfiguring RRC connection.
  This may be signaled where mode 1 is set in the network. The lack of LCG ID-to-priority mapping or LCG ID-to-LCID mapping may denote that the network cannot support priority processing.
  If the UE determines that the network cannot support priority processing, the UE transmits an LCG ID as a fixed value (e.g., 3) in transmission=D2D BSR, and otherwise, sets up an LCG ID as per priority/LCID.
  Scenario 2: Release 13 Network to Release 12 UE
  1) The UE transmits a fixed value (e.g., 3) in LCG ID=D2D BSR.
  Problem: The network may erroneously prioritize a legacy UE.
  Solution
  2) Mapping LCG ID=fixed value (e.g., 3) to low/medium priority.

In an embodiment of the present disclosure, defining a mapping between priority and LCG ID is proposed. However, the mapping is not previously defined. In an embodiment, the UE transmits a list of destination IDs (hereinafter, destination ID list) to the eNB. The eNB determines the priority corresponding to each destination ID in the destination ID list based on priority information received in the UE context. The UE context may be received from the MME. Then, the eNB allocates an LCG ID and priority value corresponding to each destination ID and transmits the same to the UE.

The UE receives priority for transmitting a packet from a higher layer (e.g., ProSe protocol layer, NAS layer, or application layer). The priority of packet may be the priority of group to which the packet is directed. The priority of the packet may be the priority of the UE transmitting the packet. As another example, the priority of the packet may be the priority of the type (e.g., emergency or normal) of a call that the UE dispatches along with the destination. The priority may be determined considering the priority for both the group and type of the call. The priority may be determined considering the priority of UE, type of call, and priority of group. To transmit the packet, the UE sends a request for resource(s) to the eNB by sending a D2D BSR. The UE determines the LCG ID corresponding to the priority received from the higher layer. The LCG ID field in the BSR is set as follows: The LCG ID may be determined using the mapping (table) between priority and LCG ID received from the eNB. The UE transmits a D2D BSR containing the determined LCG ID to the eNB.

Upon receiving the D2D BSR, the eNB determines the priority corresponding to the LCG ID received through the D2D BSR. The eNB may verify whether it is permitted for the UE to transmit in the determined priority. Such verification is carried out using the priority information (e.g., user priority, group priority) received in the UE context. As an example, where the determined priority is lower or equal to the highest priority indicated in the UE's context, the UE is permitted to transmit in the determined priority. As another example, where the determined priority is equal to the highest priority indicated in the UE's context, the UE is permitted to transmit in the determined priority. Then, the eNB prioritizes transmission according to the determined priority and allocates a grant for transmission to the UE.

As an example, the eNB may retain a separate resource pool per priority level and assign resources from the resource pool corresponding to the determined priority.

As another example, there may be only one resource pool, and the eNB allocates grants in descending order of priority.

As an example, the priority indicated by the LCG ID is the priority of destination ID (e.g., group ID). The eNB may retain a separate resource pool per priority level and assign resources from the resource pool corresponding to the determined priority. If multiple requests from several UEs are for the same priority level, the priority of UE is used to prioritize the requests.

Where multiple requests from multiple UEs are for the same priority level, the requests may be prioritized based on the destination ID. For example, unicast may be prioritized over groupcast.

When receiving the grant, the UE transmits packets using grants assigned in descending order of priority. As an example, where the priority is the priority of a group, the UE performs transmission to destination group(s) using the grants allocated in descending order of priority of destination group(s).

Figure 4:
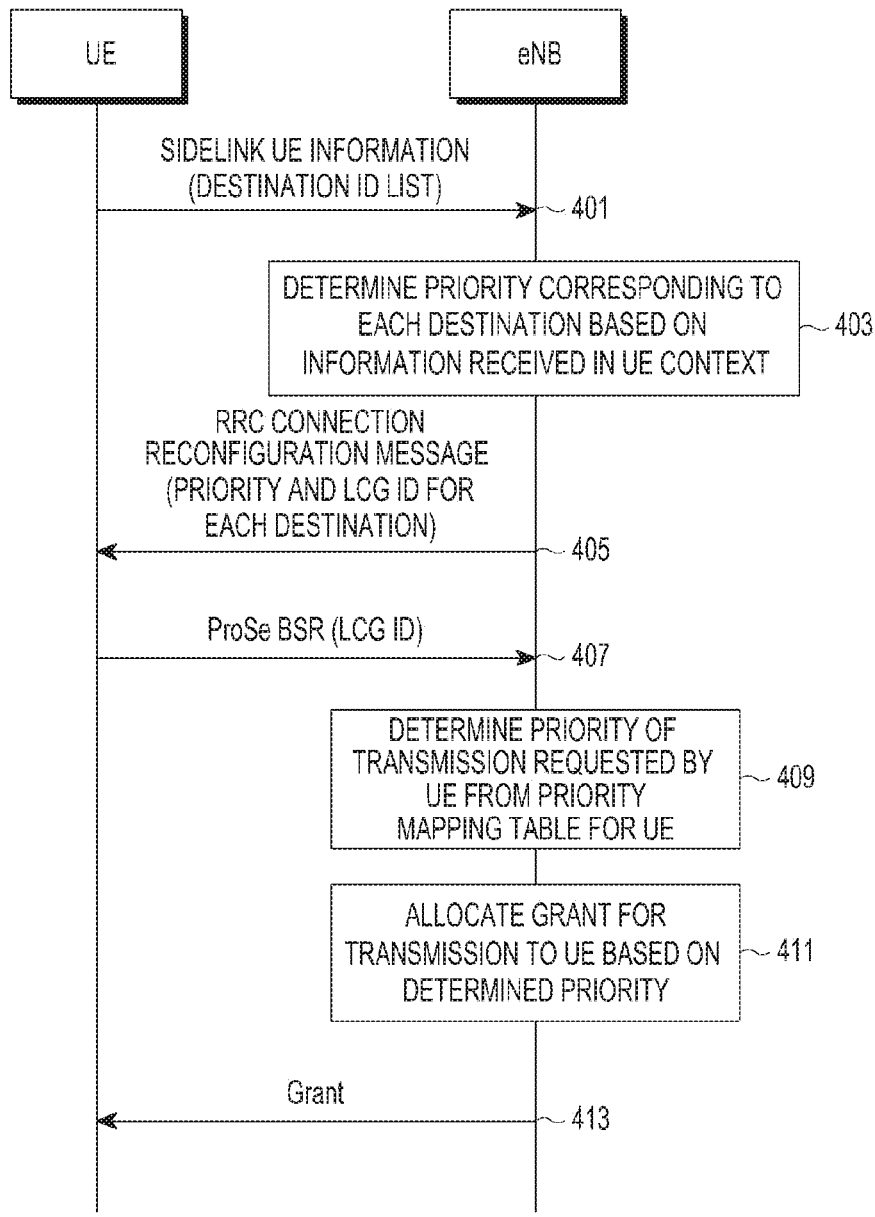
FIG. 4 is a view illustrating a method for processing a priority of transmission in a D2D communication system according to an embodiment of the present disclosure.

Now described is an example method shown in FIG. 4 according to an embodiment.

FIG. 4 is a view illustrating a method for handling priority of a transmission in a D2D communication system according to an embodiment of the present disclosure.

Referring to FIG. 4, in operation 401, the UE transmits a D2D UE information message containing a destination ID list to the eNB. In operation 403, the eNB determines the priority corresponding to each destination ID in the destination ID list based on priority information received in the UE context. In operation 405, the eNB allocates an LCG ID and priority value corresponding to each destination ID and transmits the same to the UE. At this time, the LCG ID and priority value corresponding to each destination ID may be transmitted using, for example, an RRC connection reconfiguration message. Thereafter, in operation 407, the UE determines the LCG ID corresponding to the priority received from the higher layer for packet transmission and transmits a BSR including the determined LCG ID to the eNB. Thereafter, the operations of 409, 411, and 413, in which the UE receives the grant from the eNB, are similar to the operations of 205, 207, 209, and 211 except for the verification operation of operation 207 in the example of FIG. 2. The verification operation may selectively be performed.

In an embodiment of the present disclosure, the UE receives the priority and destination ID of each packet that is to be transmitted from a higher layer(s). An additional packet type (emergency or non-emergency) may also be received. As an example, the UE may receive the priority corresponding to each destination from the eNB, as described above, and, at this time, the UE transmits a list of the destination IDs to the eNB, and the eNB then allocates the priority for each destination. To transmit the packet, the UE sends a request for resource(s) to the eNB by sending a D2D BSR to the eNB. The LCG ID field in the BSR is set as follows: If the priority or packet type corresponds to an emergency, the UE transmits a D2D BSR containing the LCG ID set as a value indicating an emergency, for example, 'X.' If the priority or packet type corresponds to a non-emergency, the UE transmits a D2D BSR containing the LCG ID set as a value indicating a non-emergency, for example, 'Y.' As 'X' and 'Y' above, each value of LCG ID previously specified for the communication system may be used. As another example, a one-bit indicator in the D2D BSR, instead of the LCG ID, may be used to indicate an emergency. As another example, unless D2D communication supports emergency, no emergency is indicated. Thus, only one LCG ID may be used, the priority may be determined based on the group ID-to-priority mapping, and, at this time, the group ID may be determined using the destination ID, destination index, or group index in the BSR.

Figure 5:
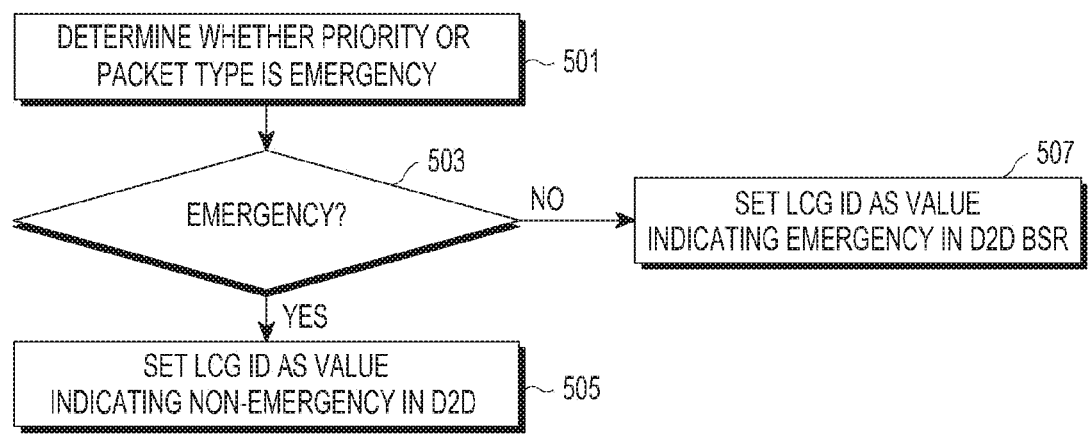
FIGS. 5, 6, and 7 are views illustrating methods for processing a priority of transmission in a D2D communication system according to an embodiment of the present disclosure.

Now described is an example method shown in FIG. 5 according to an embodiment.

FIG. 5 is a view illustrating a method for handling priority of transmission in a D2D communication system according to an embodiment of the present disclosure.

Referring to FIG. 5, in operation 501, the UE determines whether the priority or packet type of a packet to be transmitted is an emergency. Where determined to be an emergency in operation 503, the UE, in operation 505, sets the LCG ID as a value (e.g., 'X') indicating an emergency in the D2D BSR. Where determined to be a non-emergency in operation 503, the UE, in operation 507, sets the LCG ID as a value (e.g., 'Y') indicating a non-emergency in the D2D BSR.

The eNB, upon receiving the D2D BSR, determines priority as follows:

a) System supportive of both groupcast and unicast: If the destination ID (or destination index) indicated in the D2D BSR corresponds to the group identified by the group ID, and the received LCG ID is 'X,' the priority is highest (i.e., an emergency). The destination index is an order of destination IDs in the destination information list (destination-InfoList) (i.e., destination ID list). If the destination ID (or destination index) indicated in the D2D BSR corresponds to the group identified by the group ID, and the received LCG ID is 'Y,' the priority is the priority of the group identified by the group ID. The priority corresponding to the group ID may be obtained in the UE's context from the MME by the eNB.

On the contrary, the priority corresponding to the group ID may be obtained from the UE by the eNB, and here, the UE may transmit the priority corresponding to the group ID, along with the destination ID list, through an SL UE information message. If the destination ID indicated in the D2D BSR corresponds to unicast, and the received LCG ID is 'X,' the priority is an emergency. If the destination ID indicated in the D2D BSR corresponds to unicast, and the received LCG ID is 'Y,' the priority is the priority of UE where the D2D BSR is received. The priority of the UE may be received from the MME or UE by the eNB. As 'X' and 'Y' above, values of LCG ID previously specified for the communication system may be used. Now described is the method of FIG. 6 exemplifying method a) above.

Figure 6:
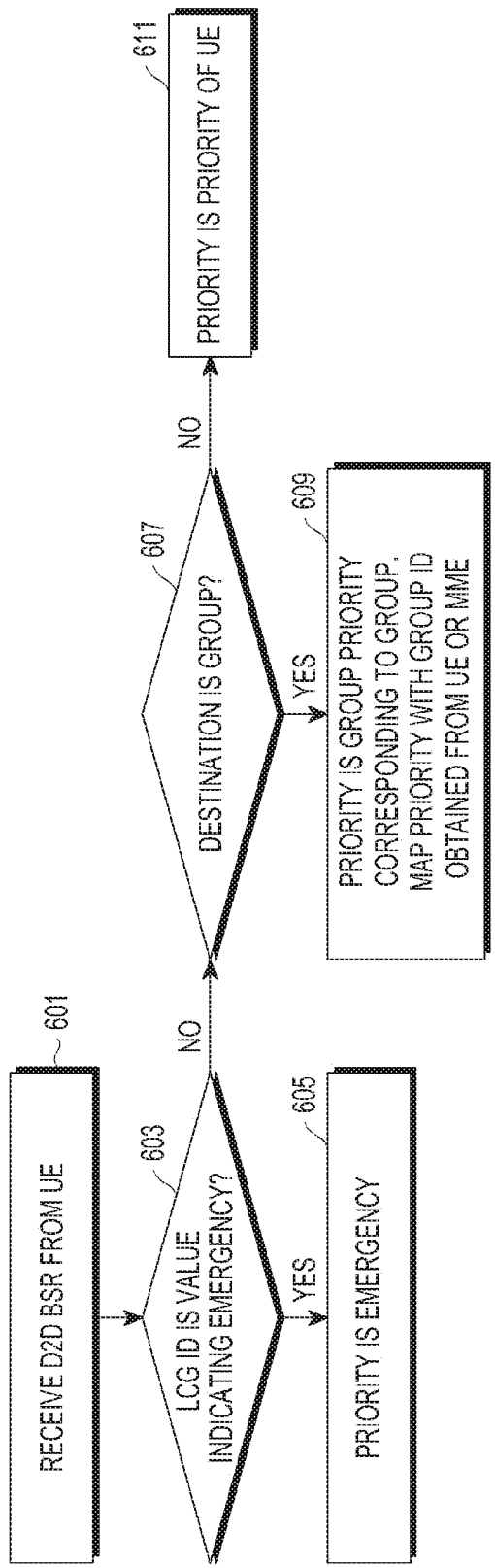

FIG. 6 illustrates a method of handling priority of transmission in a D2D communication system according to an embodiment of the present disclosure. The method of FIG. 6 exemplifies a priority processing method in a system supportive of both groupcast and unicast.

Referring to FIG. 6, upon receiving the D2D BSR from the UE in operation 601, the eNB in operation 603 determines whether the LCG ID in the D2D BSR is a value (e.g., 'X') indicating an emergency. Where the LCG ID indicates an emergency in operation 603, the eNB in operation 605 determines that the priority is an emergency. On the other hand, where the LCG ID indicates a non-emergency (e.g., where the LCG ID is 'Y') in operation 603, the eNB in operation 607 determines whether the destination ID (or destination index) indicated in the D2D BSR corresponds to the group identified by the group ID. Where determined to be the group in operation 607, the eNB in operation 609 determines that the priority is the priority corresponding to the group identified by the group ID. The priority is mapped with the group ID obtained from the UE or MME. Meanwhile, where the destination ID indicated in the D2D BSR corresponds to unicast (i.e., unless it is the group) in operation 607, the eNB determines that the priority is the priority of the UE, in operation 611.

b) System supporting only groupcast: If the LCG ID received in the D2D BSR is 'X,' the priority is an emergency. If the destination ID indicated in the D2D BSR corresponds to the group identified by the group ID, and the received LCG ID is 'Y,' the priority is the priority of the group identified by the group ID. The priority corresponding to the group ID may be obtained in the UE's context from the MME by the eNB. On the contrary, the priority corresponding to the group ID may be obtained from the UE by the eNB, and here, the UE may transmit the same, along with the destination ID list, through an SL UE information message.

Further, as another example, a one-bit indicator in the D2D BSR, instead of the LCG ID, may be used to indicate an emergency. As another example, unless emergency is supported, no emergency is indicated. Thus, only one LCG ID may be used, the priority may be determined based on the group ID-to-priority mapping, and at this time, the group ID may be determined using the destination ID, destination index, or group index in the BSR.

Figure 7:
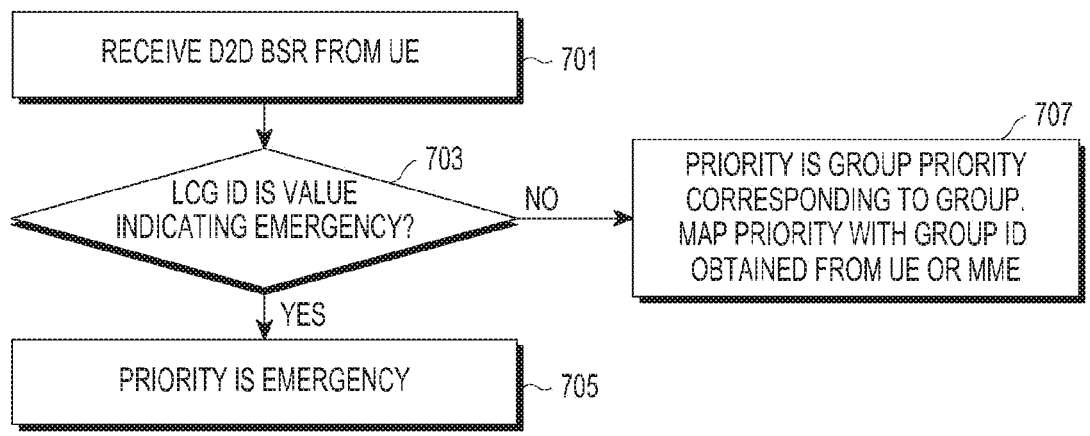

Now described is the method of FIG. 7 exemplifying method b) above.

FIG. 7 illustrates a method of handling priority of transmission in a D2D communication system according to an embodiment of the present disclosure. The method of FIG. 7 exemplifies a priority processing method in a system supportive of groupcast alone.

Referring to FIG. 7, the operations of 701, 703, and 705 are the same as the operations of 601, 603, and 605 of FIG. 6. Where determined to be the group in operation 703 of FIG. 7, (i.e., LCG ID value indicates a non-emergency), the eNB, in operation 707, determines that the priority is the priority corresponding to the group identified by the group ID. The priority is mapped with the group ID obtained from the UE or MME.

Meanwhile, the eNB may verify whether it is permitted for the UE to transmit in the determined priority. Such verification is carried out using the priority information (e.g., user priority, group priority) received in the UE context. As an example, where the determined priority is lower than or equal to the highest priority indicated in the UE's context, the UE is permitted to transmit in the determined priority. As another example, where the determined priority is equal to the highest priority indicated in the UE's context, the UE is permitted to transmit in the determined priority. Then, the eNB prioritizes the transmission according to the determined priority and allocates a grant to the UE.

As an example, the eNB may retain a separate resource pool per priority level and assign resources from the resource pool corresponding to the determined priority.

As another example, there may be only one resource pool, and the eNB allocates grants in descending order of priority.

As an example, the priority indicated by the LCG ID is the priority of destination ID (e.g., group ID). The eNB may retain a separate resource pool per priority level and assign resources from the resource pool corresponding to the determined priority. If multiple requests from several UEs are for the same priority level, the priority of UE is used to prioritize the requests.

Where multiple requests from multiple UEs are for the same priority level, the requests may be prioritized based on the destination ID. For example, unicast is prioritized over groupcast.

When receiving the grant, the UE transmits packets using grants assigned in descending order of priority. As an example, where the priority is the priority of a group, the UE performs transmission to destination group(s) using the grants allocated in descending order of priority of destination group(s).

In an embodiment of the present disclosure, the eNB sets up multiple TX resource pools, each of which has its related priority. TX resource pool may simply be termed a resource pool or TX pool. The multiple TX resource pools including a priority field may be signaled or broadcast by the eNB or may be signaled to the UE through dedicated signaling. The UE, when required to send a packet, selects a resource pool corresponding to the priority related to the packet to be transmitted.

In this method, the UE receives the priority of each packet to be transmitted from higher layers. As an example, the UE may also receive the priority corresponding to each destination ID from the eNB as described above, and at this time, the UE transmits a list of the destination IDs to the eNB, and the eNB then determines the priority for each destination ID. The priority of the packet may be the priority of a group to which the packet is directed. The priority of the packet may be the priority of the user transmitting the packet. In contrast, the priority of the packet may be the priority of the type (e.g., emergency or normal) of a call that the user dispatches along with the destination.

As an example, each resource pool is related to multiple priority levels (indicated using multiple priority fields or two fields indicating the minimum priority and the maximum priority). One priority may be mapped to several resource pools. As another example, each resource pool is related to one priority, and at this time, the UE may use the resource pool corresponding to the same or lower priority of packet transmission than the priority of the resource pool.

As another example, each pool is related to one priority, and at this time, the UE may use the resource pool corresponding to the same or higher priority of the packet transmission than the priority of the resource pool. Based on the priority, the UE selects a particular transmit pool having the same or lower priority than the priority of the packet for packet transmission.

As an example, multiple time resource pattern of transmission (T-RPT) sets may be defined in one TX pool, and each T-RPT set may be mapped to one or more priority levels similarly to the TX pool-to-priority mapping set forth above. The UE may use the T-RPT set corresponding to the same or higher priority of packet transmission than the priority of the T-RPT set. Based on the priority, the UE selects a T-RPT set having the same or lower priority than the priority of the packet for packet transmission.

Figure 8:
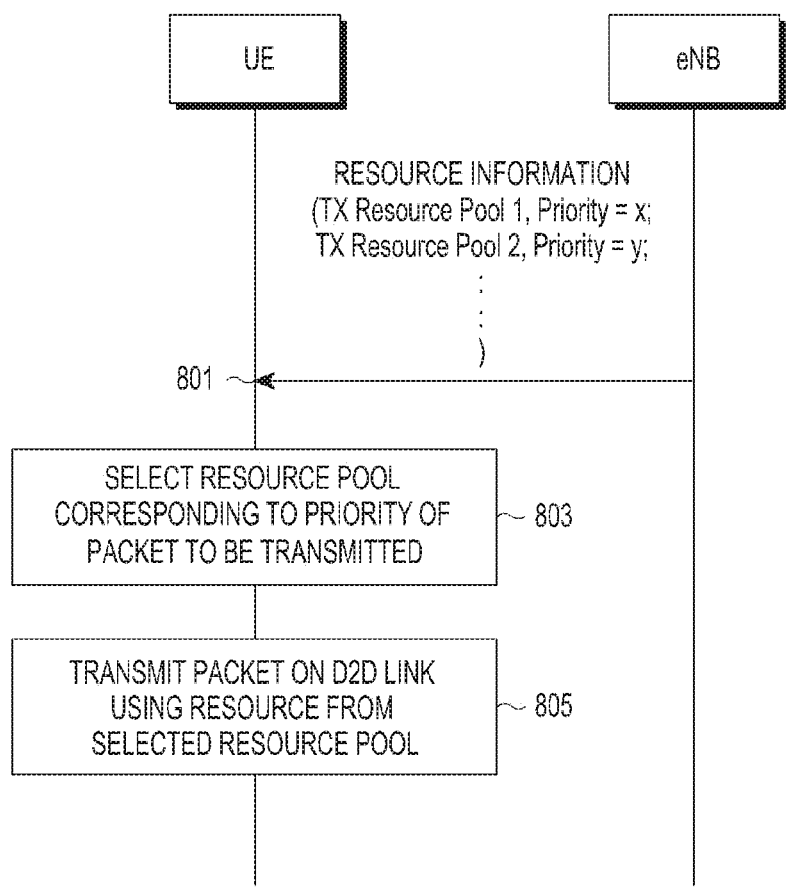
FIG. 8 is a view illustrating a method for selecting a resource pool as per priority of a packet in a D2D communication system according to an embodiment of the present disclosure.

Now described is an example method shown in FIG. 8 according to an embodiment.

FIG. 8 is a view illustrating a method for selecting a resource pool as per priority of a packet in a D2D communication system according to an embodiment of the present disclosure.

Referring to FIG. 8, in operation 801, the UE receives resource information about multiple TX resource pools including a priority field from the eNB. The resource information may be broadcast from the eNB or received through transmission signaling. In operation 803, the UE receiving the resource information selects the resource pool corresponding to the priority of the packet to be transmitted among the multiple TX resource pools. In operation 805, the UE transmits the packet on a D2D link using the resource of the selected resource pool.

As an example, one or more TX resource pools may be related with some priority. They may be used to transmit a packet of any priority by the UE.

As an example, the UE selects a particular resource pool in which one of relevant priorities is the same as the highest logical channel priority in the MAC PDU. On the contrary, the priority of each logical channel having the MAC SDU included in the MAC PDU should be the same as one of the priorities of the resource pools having resources used to transmit the MAC PDU.

Where a single resource pool of resources is configured, the UE selects a resource pool of resources that it is to use. Where multiple resource pools of resources are otherwise configured, the UE chooses to use a pool of resources having a relevant priority list including the highest priority of the SL logical channel in the MAC PDU to be transmitted from the configured resource pools of resources.

According to the present disclosure, the following options are proposed to prioritize logical channels when one or more TX pools related to one or more priorities are configured.

a) Option 1:

The UE selects the SL logical channel having the highest ProSe priority per packet (PPPP) among SL logical channels having SL data.

The UE selects a TX pool corresponding to the selected logical channel PPPP.

The UE supports (serves) the selected logical channel and may support other logical channels of the same destination having a higher priority than the priorities of the logical channels of other destinations and equal to one of the priorities in the selected TX pool.

b) Option 2:

The UE selects the SL logical channel having the highest PPPP among SL logical channels having SL data.

The UE selects a TX pool corresponding to the selected logical channel PPPP.

The UE supports the selected logical channel and may support other logical channels of the same destination having the same priority as one of the priorities of the selected TX pool.

c) Option 3:

The UE selects the SL logical channel having the highest PPPP among SL logical channels having SL data.

The UE selects a TX pool corresponding to the selected logical channel PPPP.

The UE supports the selected logical channel and may support other logical channels of the same destination.

As in the above options, the UE, after selecting the TX pool, may select resources from the selected TX pool, and the UE may support the logical channels determined as above through the resources.

In an embodiment of the present disclosure, the eNB configures one or more resource pools. Selection of a resource pool is not based on priority. Each priority is related to the TX probability of a packet. For example, an example of mapping between TX probability and priority is shown in Table 2 below.

TABLE 2

| Tx probability | Priority |
| --- | --- |
| 0.25 | Low |
| 0.5 | Medium |
| 0.75 | High |
| 1 | Emergency |

The mapping between priority and TX probability may previously be specified or may be signaled through broadcasting or dedicated signaling. The UE, when required to transmit some packet, sends the packet having a TX probability related to the priority of the packet to be transmitted. As an example, multiple priority levels may be related to the same TX probability.

In the instant embodiment, the UE receives the priority of each packet to be transmitted from higher layers. As an example, the UE may also receive the priority corresponding to each destination from the eNB as described above, and at this time, the UE transmits a list of the destination IDs to the eNB, and the eNB then allocates the priority for each destination. The priority of the packet may be the priority of a group to which the packet is directed. The priority of the packet may be the priority of the UE transmitting the packet. In contrast, the priority of the packet may be the priority of the type (e.g., emergency or normal) of a call that the UE dispatches along with the destination.

In an embodiment of the present disclosure, the eNB sets up multiple TX resource pools, each of which has its related priority. The multiple TX resource pools including a priority field may be signaled or broadcast by the eNB or may be signaled to the UE through dedicated signaling. As an example, each resource pool is related to multiple priority levels (indicated using multiple priority fields or two fields indicating the minimum priority and the maximum priority). The UE, when required to send a packet, selects a resource pool corresponding to the priority related to the group where the packet is to be transmitted. After selecting the resource pool, the UE performs transmission based on the TX probability, and at this time, the TX probability is mapped to the priority of the UE. For example, an example of mapping between TX probability and user priority is shown in Table 2 above.

Figure 9:
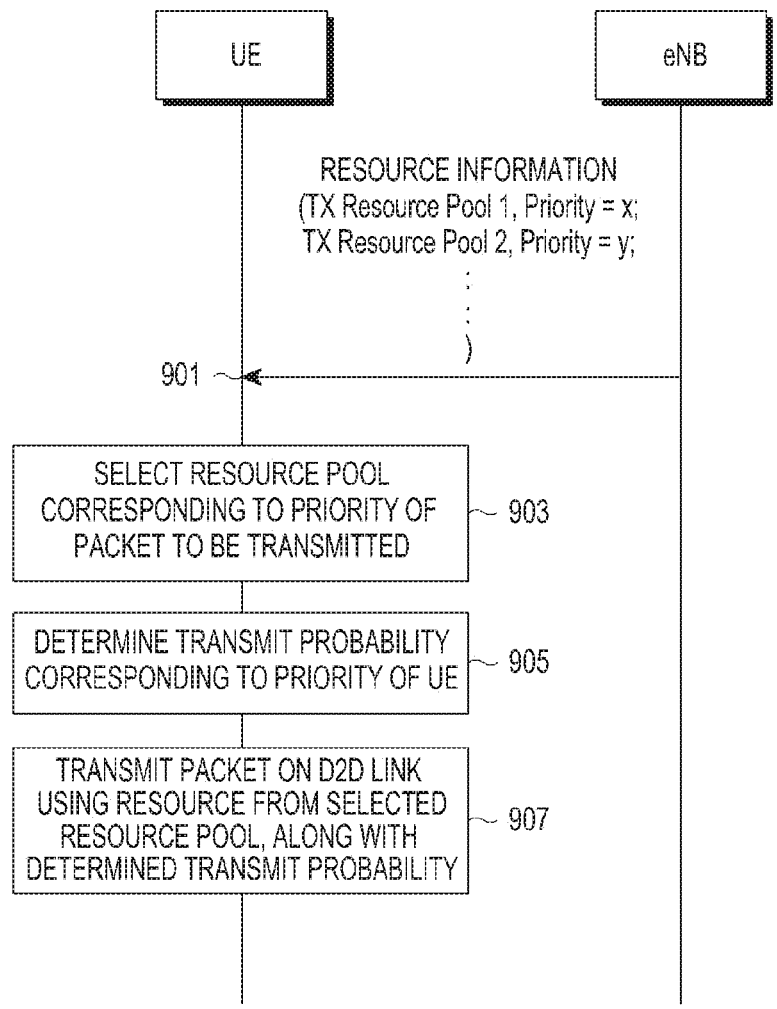
FIG. 9 is a view illustrating a method for selecting a resource pool as per priority of a packet in a D2D communication system according to an embodiment of the present disclosure.

Now described is an example method shown in FIG. 9 according to an embodiment.

FIG. 9 is a view illustrating a method for selecting a resource pool as per priority of a packet in a D2D communication system according to an embodiment of the present disclosure.

Referring to FIG. 9, in operation 901, the UE receives resource information about multiple TX resource pools including a priority field from the eNB. The resource information may be broadcast from the eNB or received through transmission signaling. In operation 903, the UE receiving the resource information selects the resource pool corresponding to the priority of the packet to be transmitted among the multiple TX resource pools. In operation 905, the UE determines the TX probability corresponding to the priority of the UE, and the UE in operation 907 transmits the packet on the D2D link using the resource of the selected resource pool at the determined TX probability.

In an embodiment of the present disclosure, the eNB configures a TX resource pool (including a scheduling control period, resource(s) for SA within the scheduling control period, and resource(s) for data transmission within the scheduling control period). To support an emergency, the UE interested in transmitting an emergency packet transmits a control message (for example, an emergency warning as per priority) in a scheduling control period 'x' and then transmits an emergency data packet in a scheduling control period 'x+1.' The UE interested in transmitting a non-emergency packet monitors and identifies whether an emergency control message is received in the scheduling control period 'x.' Where such emergency control message is received, the UE abstains from non-emergency transmission in the scheduling control period 'x+1.' As an example, the emergency control message may be transmitted through MAC CE or SA, and at this time, the field of the SA or cyclic redundancy check (CRC) mask may indicate the emergency control message. As another example, the emergency control message may be a sequence transmitted at a fixed ProSe within the scheduling control period.

As another example, the UE interested in transmitting an emergency packet transmits a control message for an emergency warning as per priority, in a scheduling control period 'x' and then transmits an emergency data packet in the scheduling control period 'x.' The UE interested in transmitting a non-emergency packet monitors and identifies whether an emergency control message is received in the scheduling control period 'x.' Where such emergency control message is received, the UE abstains from non-emergency transmission in the scheduling control period 'x.' In this case, resources for the transmission are present ahead of resources for the transmission of the SA indicating data transmission. As an example, SA resources for SA indicating the emergency control message and SA resources for SA indicating data may separately be indicated within the scheduling control period. The SA resources for SA indicating the emergency control message are present ahead of SA resources for SA indicating data.

In an embodiment of the present disclosure, the eNB configures one or more TX resource pools, each of which is related to one priority. To transmit a packet of a predetermined priority, the UE first selects a resource pool corresponding to the priority. The UE then sends a priority control message within the scheduling control period 'x' of the pool corresponding to the priority, then sends a packet within a next scheduling control period 'x+1' or within 'x.'

The priority control message is used by the UE within the scheduling control period 'x' of the resource pool corresponding to the priority, allowing it to be determined whether the UE may send some priority or lower priority of a packet. If the UE fails to detect the priority control message within the scheduling control period 'x' of the resource pool, the UE may transmit some priority or lower priority of a packet within the scheduling control period 'x+1' or 'x' of the pool.

As an example, the priority control message may be transmitted as a MAC CE or SA, and at this time, the CRC mask or field of the SA indicates the priority control message. As another example, the priority control message may be a sequence transmitted at a fixed ProSe within the scheduling control period.

Hereinafter, a scheme for reducing BSR overhead and SL BSR for one-to-one D2D communication unicast is described as proposed according to an embodiment of the present disclosure.

SL BSR for One-to-One D2D Communication Unicast

In legacy D2D communication, a D2D BSR includes a group index field.

Group index: The group index field identifies a D2D destination. The field is four-bit long. The value of the field is set as the index (i.e., D2D layer 2 group ID) of the destination reported in the destination information list (destinationInfoList) field of the D2D UE information message transmitted by the UE to the eNB.

It is proposed to support a 'relay from UE to network' function in advanced D2D communication. Communication between a remote UE and 'relay from UE to network' is by nature unicast. Unicast IDs are used for communication between remote UE and 'relay from UE to network.' For mode 1 (scheduled) resource allocation, the remote UE or 'relay from UE to network' should send a D2D BSR to request resources. At issue is how to indicate a unicast destination through the D2D BSR if the current D2D BSR indicates the group index alone. The eNB should be able to identify whether the destination is a unicast destination or groupcast destination when sending the D2D BSR. The eNB should also be able to identify the destination ID.

According to an embodiment of the present disclosure, the unicast ID may be indicated by method 1, 2, or 3 in the SL BSR:

<Method 1> a) Destination information in an SL UE information (SidelinkUEInformation) message:

FIGS. 10, 11A, 11B, 12, 13A, 13B, 14A, 14B, and 15 are views illustrating an SL BSR for one-to-one D2D communication unicast according to an embodiment of the present disclosure.

Figure 10:
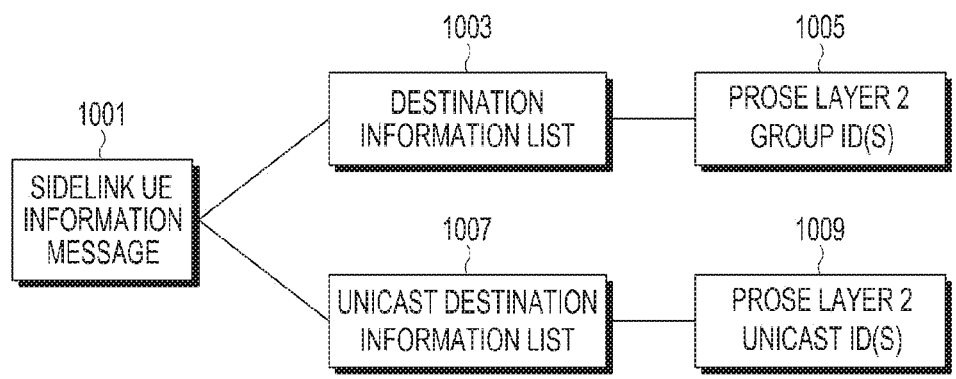
FIGS. 10, 11A, 11B, 12, 13A, 13B, 14A, 14B, and 15 are views illustrating a sidelink (SL) buffer status report (BSR) for a one-to-one D2D communication unicast according to an embodiment of the present disclosure.

Referring to FIG. 10, a new unicast destination information list (UnicastdestinationInfoList) 1007, besides the legacy destination information list (destinationInfoList), is added to the SL UE information message 1001. The unicast destination list includes a ProSe layer 2 unicast ID(s) 1009. The SL UE information message may include a destination information list 1003, as shown in FIG. 10, and the destination information list includes a ProSe layer 2 group ID(s) 1005.

The unicast destination list indicates a list of unicast IDs for which the UE is interested in one-to-one communication. When the UE is interested in one-to-one communication with at least one UE, the UE transmits, to the eNB, an SL UE information message along with a unicast destination list for requesting resources. The UE may transmit the SL UE information message together with the unicast destination list whenever the unicast destination list is subject to a change. As an example, if the resources selected by the UE are allocated to the UE, the UE may abstain from transmitting the SL UE information message together with the unicast destination list whenever the unicast destination list is subject to a change.

After a handover, the UE, absent a variation in the unicast destination list, need not transmit the SL UE information and the unicast destination list to the eNB. As an example, if the resources selected by the UE are allocated from the source eNB to the UE, the UE, after a handover to a new eNB, may send the SL UE information message and the unicast destination list. During the handover, the source eNB transmits the information received from the UE to a target eNB.

b) Destination indexing: Destination indexing may be performed by approach 1 or approach 2 below.

Figures 11A, 11B:
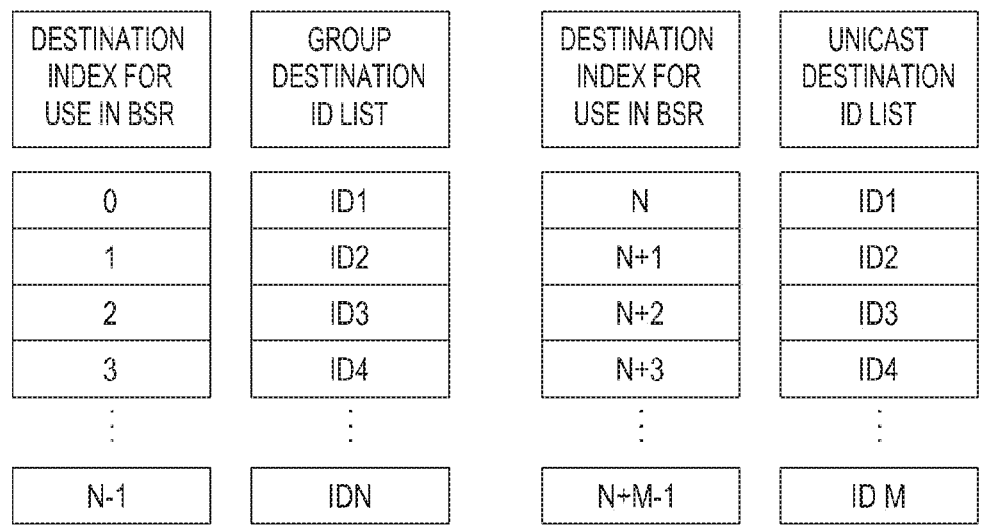

Approach 1:

Referring to FIGS. 11A and 11B, the destination IDs are indexed over two lists. The index of the first destination ID in the unicast destination ID list is the index of the last destination ID in the 'destination information list (destinationInfoList)+1.' In contrast, the index of the first destination ID in the unicast destination list is the 'number of destinations in 0+destination information list.' This index is used for SL BSR as in the example of FIG. 12.

Figure 12:
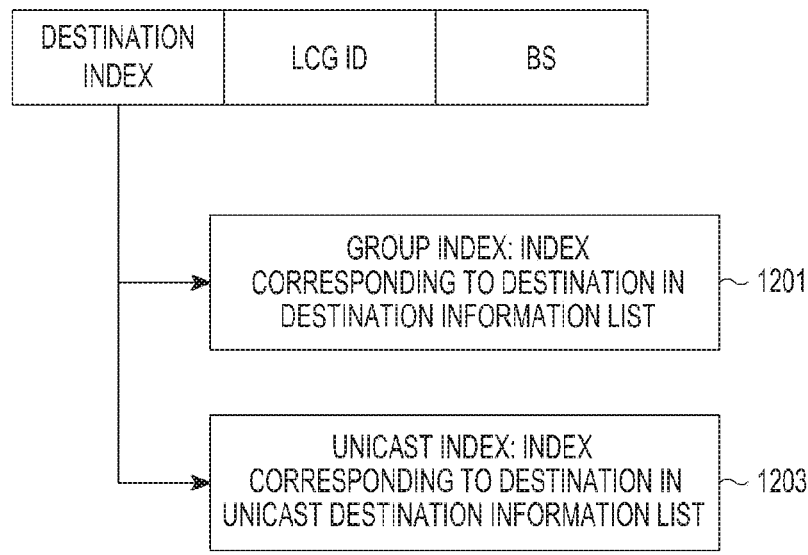

Referring to FIG. 12, the destination index comprises group index 1201 and/or unicast index 1203, and the group index 1201 is an index corresponding to a destination in the destination information list, and the unicast index 1203 is an index corresponding to a destination in the unicast destination information list. Approach 1 above requires no variation in the D2D BSR. Although the unicast destination ID and the group destination ID have the same value, it would raise no issue because the index is able to uniquely identify whether the destination is unicast or groupcast. In contrast, the index of the first destination ID in the destination information list is the index of the last destination ID in the 'unicast destination list+1.'

Figures 13A, 13B:
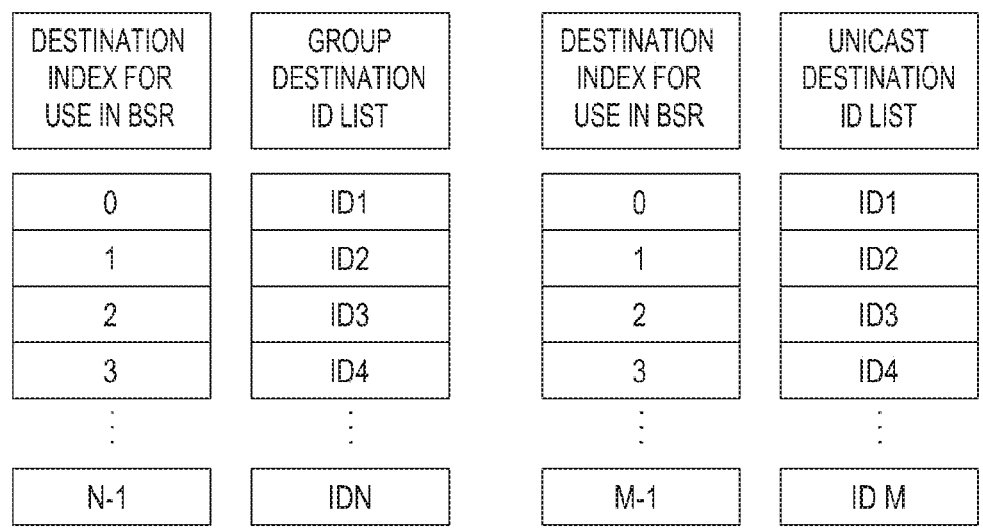

Approach 2:

Referring to FIGS. 13A and 13B, in approach 2, destination IDs are independently indexed for each list. The index of FIGS. 13A and 13B is used for SL BSR as shown in FIGS. 14A and 14B.

Figure 14A:
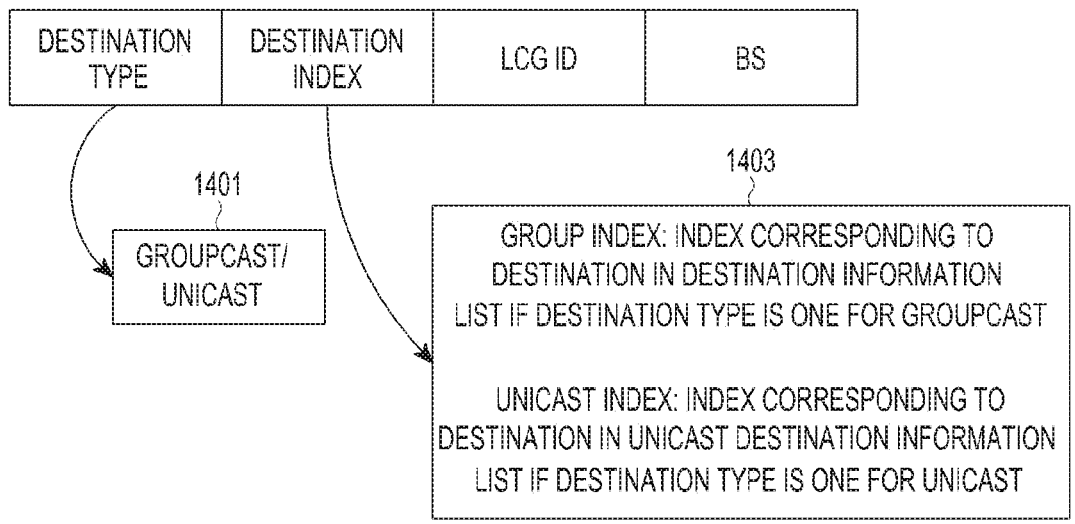

Referring to FIG. 14A, a new SL BSR is defined to indicate the buffer size of both unicast and groupcast. The destination type identifies whether the index corresponds to the group destination ID list (groupcast) or unicast destination ID list (unicast) 1401. The destination index, if the destination type is one for groupcast, is a group index corresponding to the destination in the destination information list 1403, and if the destination type is one for unicast, is a unicast index corresponding to the destination in the destination information list 1403. The new SL BSR will be indicated using the LCID in the MAC subheader different from that used for the D2D BSR. In one BSR, one or several sets may be indicated for the destination type, destination index, LCG ID, and BS.

Figure 14B:
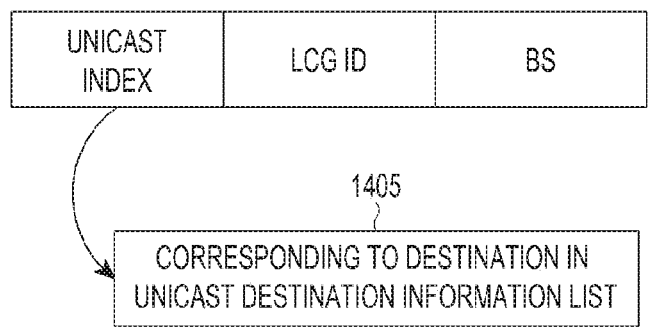

Referring to FIG. 14B, in contrast to the above, a new SL BSR is defined to indicate the buffer size of unicast. In one BSR, one or several sets may be indicated for the unicast index, LCG ID, and BS. The new SL BSR will be indicated using the LCID in the MAC subheader different from that used for the D2D BSR. The unicast index corresponds to a destination in the unicast destination information list 1405.

As an example, there may be several destination lists (a destination list having group IDs, a destination list having a unicast ID, and a destination list having unicast IDs of the relay). In this case, each destination index in each of the lists is given to a destination. Destination indexing, starting with destination index 0 for the first destination in the first destination list, is sequentially performed over all the lists. The first destination in the second destination list has the same index as the number of destinations in the first destination list. The first destination in the third destination list has the same index as the number of destinations that are the summation of those in the first and second destination lists.

Destination indexing, starting with destination index 0 for the first destination in the first destination list, is sequentially performed over all the lists. The first destination in the second destination list has the same index as 'index of last destination+1' in the first destination list. The first destination in the third destination list has the same index as 'index of last destination+1' in the second destination list.

As an example, there may be two destination lists (a destination list having group IDs, a destination list having a unicast ID, and a destination list having unicast IDs of the relay). In this case, each destination index in each of the destination lists is given to a destination. Destination indexing, starting with destination index 0 for the first destination in the first destination list, is sequentially performed over all the lists. The first destination in the second destination list has the same index as the number of destinations in the first destination list. Destination indexing, starting with destination index 0 for the first destination in the first destination list, is sequentially performed over all the destination lists. The first destination in the second destination list has the same index as 'index of last destination+1' in the first destination list.

Destination indexing, starting with destination index 0 for the first destination in the first destination list, is sequentially performed over all the destination lists. The first destination in the second destination list has the same index as 'index of last destination+1' in the first destination list. The key is that destination indexes (started with 0 or 1) are sequentially allocated for each destination (beginning at the first destination in the first destination list and up to the last destination in the last destination list).

<Method 2>

Figure 15:
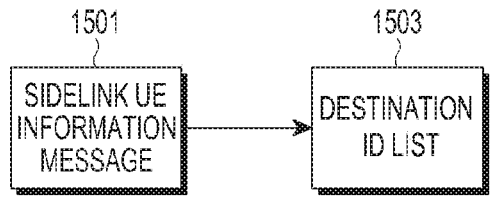

Referring to FIG. 15, unicast and groupcast destination IDs are indicated in one destination ID list 1503 in the SL UE information message 1501. The destination index is used for SL BSR as shown in FIGS. 16A and 16B.

Figure 16A:
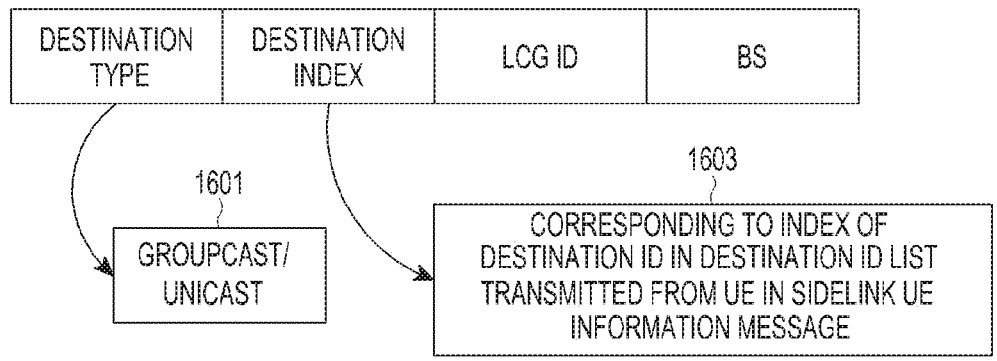
FIGS. 16A and 16B are views illustrating a sidelink (SL) buffer status report (BSR) for a D2D communication according to an embodiment of the present disclosure.
Figure 16B:
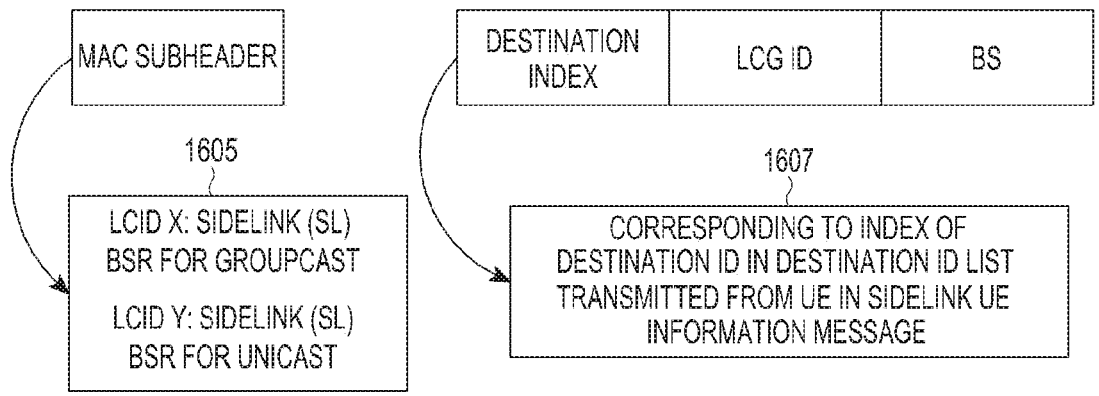

FIGS. 16A and 16B are views illustrating a sidelink (SL) buffer status report (BSR) for a D2D communication according to an embodiment of the present disclosure.

Referring to FIG. 16A, a new SL BSR is defined to indicate the buffer size of both unicast and groupcast. The destination type identifies whether the destination identified by the index is a group destination (groupcast) or one for unicast 1601. The destination index is the index of the destination ID in the destination ID list transmitted from the UE in the SL UE information message 1603. The new SL BSR will be indicated using the LCID in the MAC subheader different from that used for the D2D BSR. In one BSR, one or several sets may be indicated for the destination type, destination index, LCG ID, and BS.

Referring to FIG. 16B, in contrast with the above, a new SL BSR is defined to indicate the buffer size of unicast. In one BSR, one or several sets may be indicated for the destination index, LCG ID, and BS. The new SL BSR will be indicated using the LCID in the MAC subheader different from that used for the D2D BSR for groupcast. In the MAC subheader, for example, LCID X indicates the SL BSR for groupcast, and LCID Y indicates the SL BSR for unicast 1605. The destination index is the index of the destination ID in the destination ID list transmitted from the UE in the SL UE information message 1607.

<Method 3>

A new destination ID list is transmitted through an SL UE information message. Each element in the destination ID list includes the destination ID and type (unicast or groupcast) of the destination. Legacy D2D BSR is used, and at this time, the group index is replaced with the destination index. The destination index field of the destination index identifies the D2D destination. The field is four-bits long. The field value is set as the index (i.e., D2D layer 2 group ID or unicast ID) of the destination reported in the new destination information list field of the D2D UE information message transmitted by the UE to the eNB.

As an example, the new destination information list may be used when at least one of destination IDs to be reported is unicast.

The new destination information list may be implemented as shown in Tables 3 and 4 below.

TABLE 3

SL-DestinationInfoList-new ::= SEQUENCE (SIZE (1..maxSL-Dest-r12)) OF
SL-DestinationIdentity-new
SL-DestinationIdentity-new CHOICE {
ProSe layer 2 group ID
ProSe layer 2 unicast ID
}
ProSe layer 2 group ID :: = BIT STRING (SIZE (24))
ProSe layer 2 unciast ID:: :: = BIT STRING (SIZE (24))

TABLE 4

SL-DestinationInfoList-new ::= SEQUENCE (SIZE (1..maxSL-Dest-r12)) OF
SL-DestinationIdentity-new
SL-DestinationIdentity-new SEQUENCE {
Destination Type
Destination ID
}
Destination ID :: = BIT STRING (SIZE (24))

In the above embodiments, the priority may be indicated using the LCG ID, and as another example, the priority field may be included in the BSR.

Reduction in BSR Overhead

Several LCG IDs may be present per destination index. Such a destination index will be added several times when the BSR should report the BS to several LCGs of the same destination. According to an embodiment of the present disclosure, overhead may be reduced using the BSR structures shown in FIGS. 17 and 18.

Figure 18:
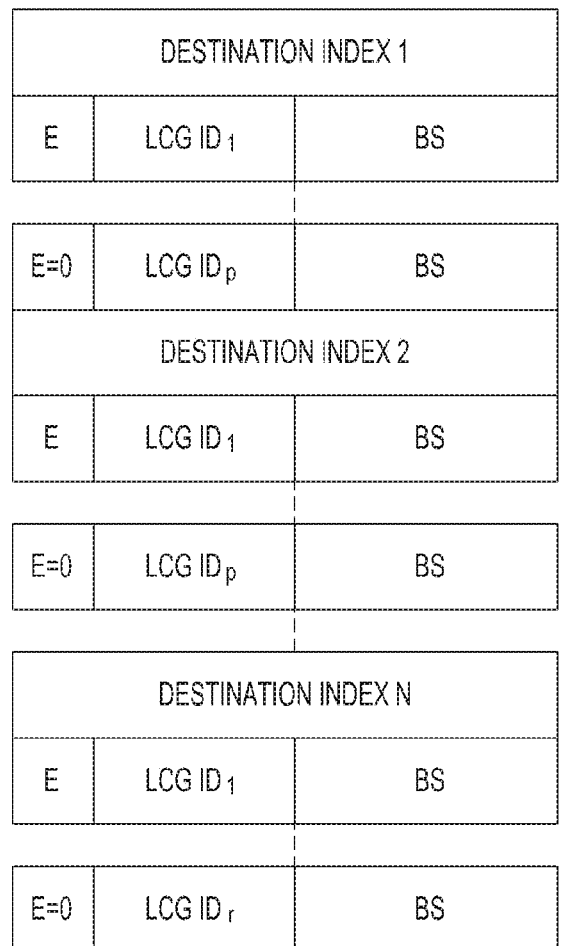

FIGS. 17 and 18 are views illustrating a BSR structure for reducing overhead according to an embodiment of the present disclosure.

Referring to FIG. 18, 'E' is an expanded bit. Being set to 1 denotes whether the BS of a different LCG ID is present or not for the same destination index. For example, if four LCG IDs are reported for the same destination ID, 'E' is set to 0 for first three LCGs and to 1 for the last LCG.

According to the above embodiments, the UE and the eNB each may be implemented to include a transceiver for transmitting and receiving data and a controller or at least one processor for controlling the overall apparatus to perform the methods according to the embodiments described above in connection with FIGS. 1, 2, 3A, 3B, 4, 5, 6, 7, 8, 9, 10, 11A, 11B, 12, 13A, 13B, 14A, 14B, 15, 16A, 16B, 17, and 18.

For example, the UE may be implemented to include a transceiver configured to transmit and receive data to process priority, and a controller or at least one processor configured to perform control to receive a priority for a packet to be transmitted from a higher layer, map the packet to a logical channel based on the priority and a destination to which the packet is to be transmitted, receive a grant for transmission of the packet from an eNB, and transmit the packet. The eNB may be implemented to include a transceiver and a controller or at least one processor to perform operations corresponding to those of the UE.

Further, for example, the eNB may be implemented to include a transceiver configured to transmit and receive data to process a transmit resource pool and a controller or at least one processor configured to perform control to configure multiple transmit resource pools where each transmit resource pool for D2D communication has at least one priority and signal priority information about the multiple transmit resource pools. The UE may be implemented to include a transceiver and a controller or at least one processor to perform operations corresponding to those of the eNB.

Two or more of the above-described embodiments of the present disclosure may be fulfilled in combination to perform associated operations.

The apparatuses and methods according to embodiments of the present disclosure may be implemented in hardware, software, or a combination of hardware and software. Such software may be recorded in volatile or non-volatile storage devices, such as read only memories (ROMs), memories, such as random access memories (RAMs), memory chips, memory devices, or integrated circuit devices, compact discs (CDs), digital versatile discs (DVDs), magnetic disks, magnetic tapes, or other optical or magnetic storage devices while retained in machine (e.g., computer)-readable storage media. The methods according to embodiments of the present disclosure may be implemented by a computer or a portable terminal including a controller or at least one processor and a memory, and the memory may be a machine-readable storage medium that may properly retain program(s) containing instructions for implementing the embodiments of the present disclosure. Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for processing a priority for transmission by a user equipment (UE) in a device-to-device (D2D) communication system, the method comprising:
identifying a priority assigned for a packet to be transmitted, the packet being mapped to a logical channel associated with the priority and a destination to which the packet is to be transmitted;
selecting the destination having the logical channel of a highest priority among logical channels having data for transmission;
selecting, from among a plurality of transmission resource pools, a transmission resource pool in which one of associated priorities of the transmission resource pool is equal to a priority of a logical channel with the highest priority among logical channels identified in a medium access control protocol data unit (MAC PDU), wherein the transmission resource pool is associated with two or more priorities;
allocating resources for transmission from the transmission resource pool to the logical channel having the highest priority among logical channels belonging to the destination; and
generating the MAC PDU and transmitting the MAC PDU based on the transmission resource pool,
wherein, if resources for transmission remain, the logical channels belonging to the destination are served in descending order of priority until either data for the logical channels belonging to the destination is exhausted or a grant for transmission is exhausted.

2. The method of claim 1,
wherein the UE comprises a higher layer and a lower layer, and
wherein the priority assigned for the packet is transferred from the higher layer to the lower layer.

3. The method of claim 1,
wherein the priority is determined by a base station based on priority information received in a UE context, and
wherein the UE context is received by the base station from a mobile management entity (MME).

4. The method of claim 1, further comprising:
receiving information on the plurality of transmission resource pools, each transmission resource pool being associated with one or more priorities.

5. The method of claim 1,
wherein packets for different destinations are associated with different logical channels, and
wherein packets having different priorities are associated with different logical channels.

6. The method of claim 1, wherein the priority of the logical channel is identical to the priority of the packet mapped to the logical channel.

7. A user equipment (UE) in a device-to-device (D2D) communication system, the UE comprising:
a transceiver configured to transmit and receive data; and
at least one processor configured to:
identify a priority assigned for a packet to be transmitted, the packet being mapped to a logical channel associated with the priority and a destination to which the packet is to be transmitted,
select the destination having the logical channel of a highest priority among logical channels having data for transmission,
select, from among a plurality of transmission resource pools, a transmission resource pool in which one of associated priorities of the transmission resource pool is equal to a priority of a logical channel with the highest priority among logical channels identified in a medium access control protocol data unit (MAC PDU), wherein the transmission resource pool is associated with two or more priorities, allocate resources for transmission from the transmission resource pool to the logical channel having the highest priority among logical channels belonging to the destination, generate the MAC PDU, and control the transceiver to transmit the MAC PDU based on the transmission resource pool, wherein, if resources for transmission remain, the logical channels belonging to the destination are served in descending order of priority until either data for the logical channels belonging to the destination is exhausted or a grant for transmission is exhausted.

8. The UE of claim 7, wherein the UE comprises a higher layer and a lower layer, and wherein the priority assigned for the packet is transferred from the higher layer to the lower layer.

9. The UE of claim 7, wherein the priority is determined by a base station based on priority information received in a UE context, and wherein the UE context is received by the base station from a mobile management entity (MME).

10. The UE of claim 7, wherein the at least one processor is further configured to:

receive information on the plurality of transmission resource pools, each transmission resource pool being associated with one or more priorities.

11. The UE of claim 7, wherein packets for different destinations are associated with different logical channels, and wherein packets having different priorities are associated with different logical channels.

12. The UE of claim 7, wherein the priority of the logical channel is identical to the priority of the packet mapped to the logical channel.

\* \* \* \* \*